United States Patent
Inoue

(10) Patent No.: US 10,402,131 B2
(45) Date of Patent: Sep. 3, 2019

(54) IMAGE PROCESSING APPARATUS AND METHOD TO FORM IMAGE ON SHEET USING PAGE IMAGE DATA AND OBJECT INFORMATION

(71) Applicant: CANON KABUSHIKI KAISHA, Tokyo (JP)

(72) Inventor: Takuya Inoue, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/836,426

(22) Filed: Dec. 8, 2017

(65) Prior Publication Data
US 2018/0165046 A1 Jun. 14, 2018

(30) Foreign Application Priority Data
Dec. 13, 2016 (JP) .................... 2016-241710

(51) Int. Cl.
*G06F 3/12* (2006.01)
(52) U.S. Cl.
CPC ............ *G06F 3/1238* (2013.01); *G06F 3/122* (2013.01); *G06F 3/1212* (2013.01); *G06F 3/1244* (2013.01); *G06F 3/1248* (2013.01); *G06F 3/1288* (2013.01)
(58) Field of Classification Search
None
See application file for complete search history.

(56) References Cited

U.S. PATENT DOCUMENTS

| 5,129,049 A | 7/1992 | Cuzzo | |
| 7,016,061 B1* | 3/2006 | Hewitt | G06F 3/1213 358/1.13 |
| 8,908,207 B2* | 12/2014 | Nishimaki | G06F 3/1213 358/1.13 |
| 2001/0043355 A1* | 11/2001 | Bando | G06K 15/00 358/1.15 |
| 2002/0054312 A1* | 5/2002 | Tomita | G06F 3/1204 358/1.13 |
| 2003/0095282 A1* | 5/2003 | Suzuki | G06F 3/1247 358/1.15 |
| 2004/0061892 A1* | 4/2004 | Ferlitsch | G06F 3/1211 358/1.15 |
| 2007/0195353 A1 | 8/2007 | Tsunoda | |

FOREIGN PATENT DOCUMENTS

| JP | 2006-85376 A | 3/2006 |
| JP | 2011-257799 A | 12/2011 |
| JP | 2012-8838 A | 1/2012 |
| JP | 2013-203003 A | 10/2013 |

* cited by examiner

*Primary Examiner* — Thomas D Lee
(74) *Attorney, Agent, or Firm* — Canon U.S.A., Inc. IP Division

(57) ABSTRACT

A controller is configured to perform acquiring particular print data, acquiring first page image data, and acquiring transmit print data. The particular print data includes a plurality of pieces of page information which includes first page information including a plurality of pieces of first object information and second page information including a plurality of pieces of second object information. Acquiring the first page image data is based on the plurality of pieces of object information in the first page information. The transmit print data is transmitted to an image forming apparatus and includes the first page image data and the second page information.

12 Claims, 15 Drawing Sheets

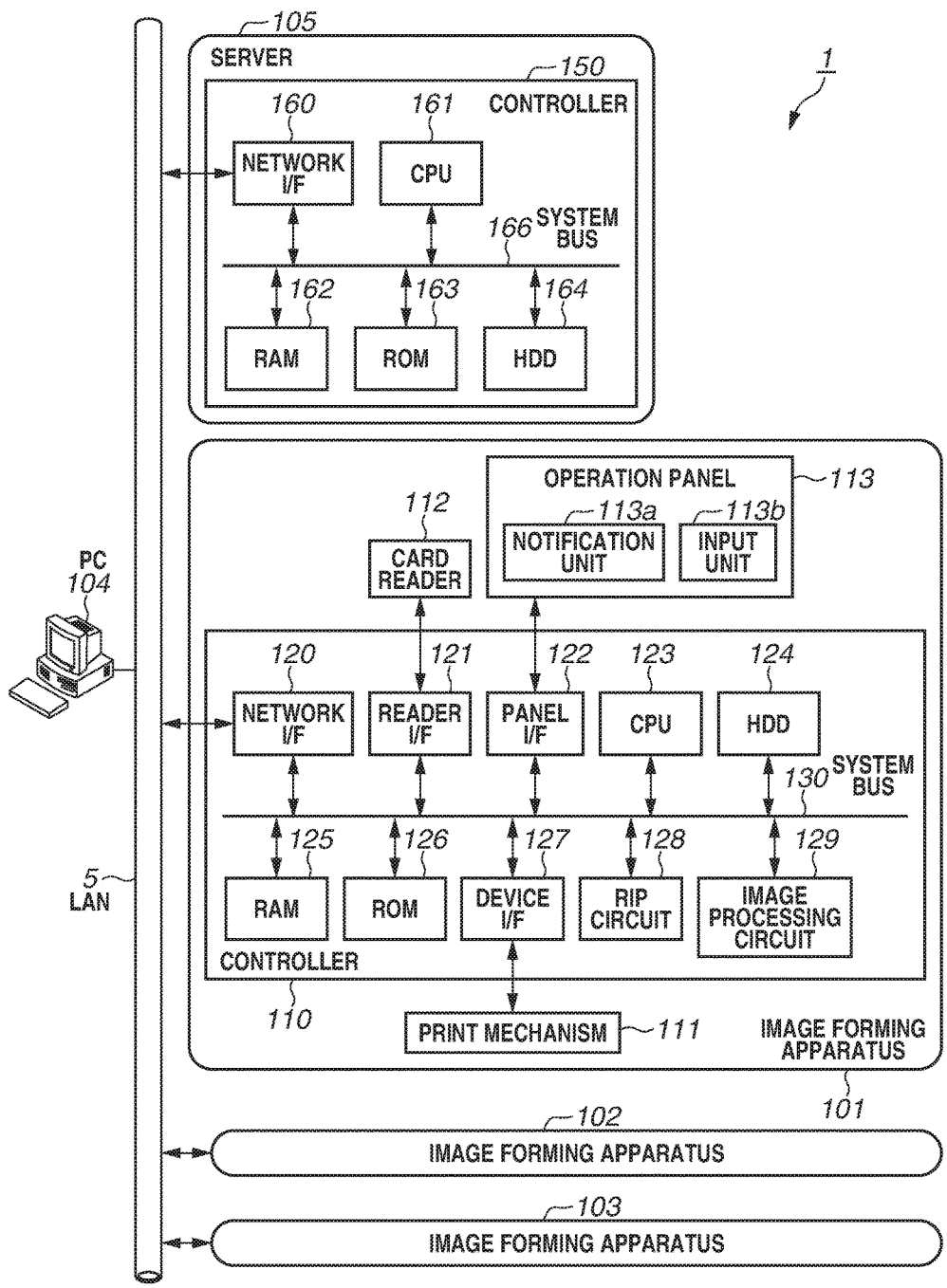

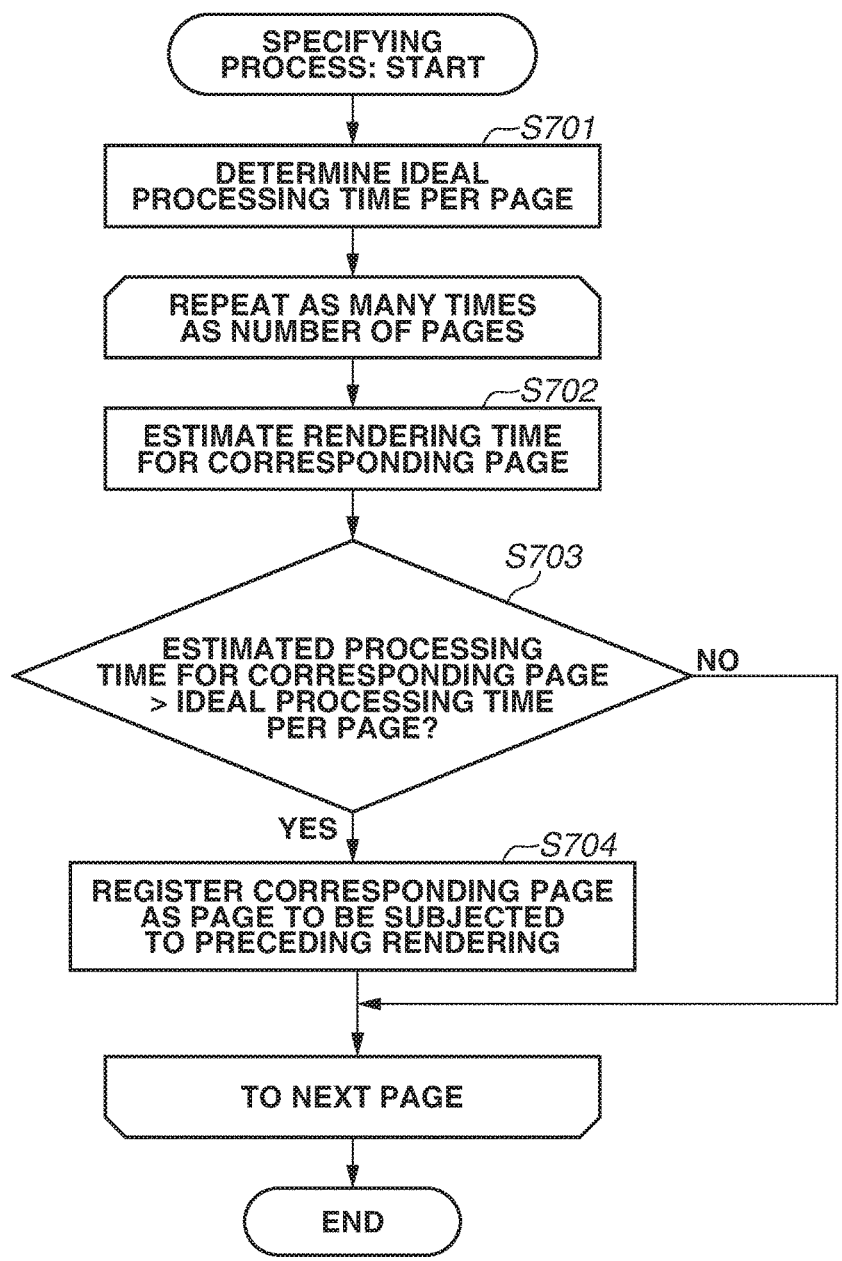

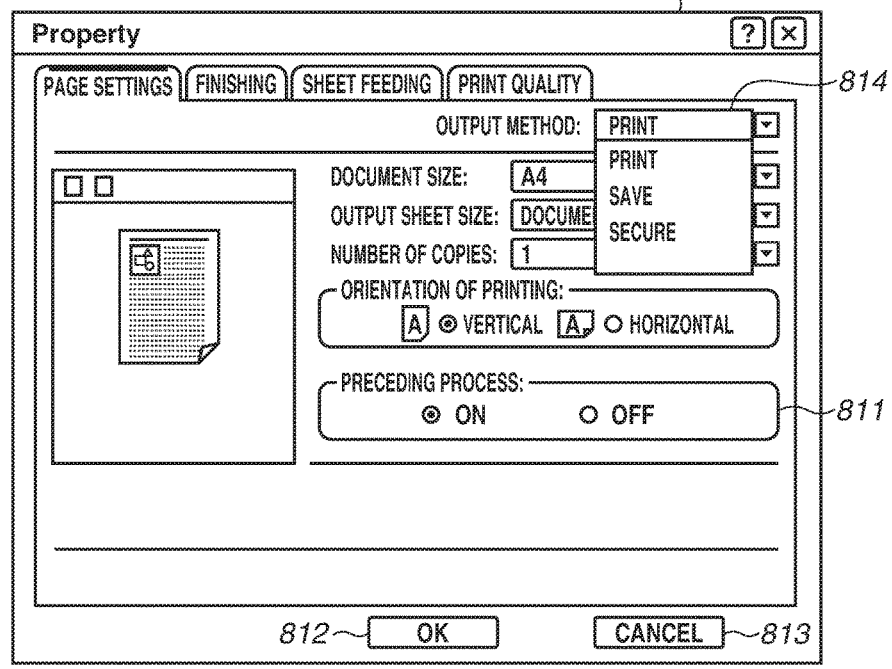

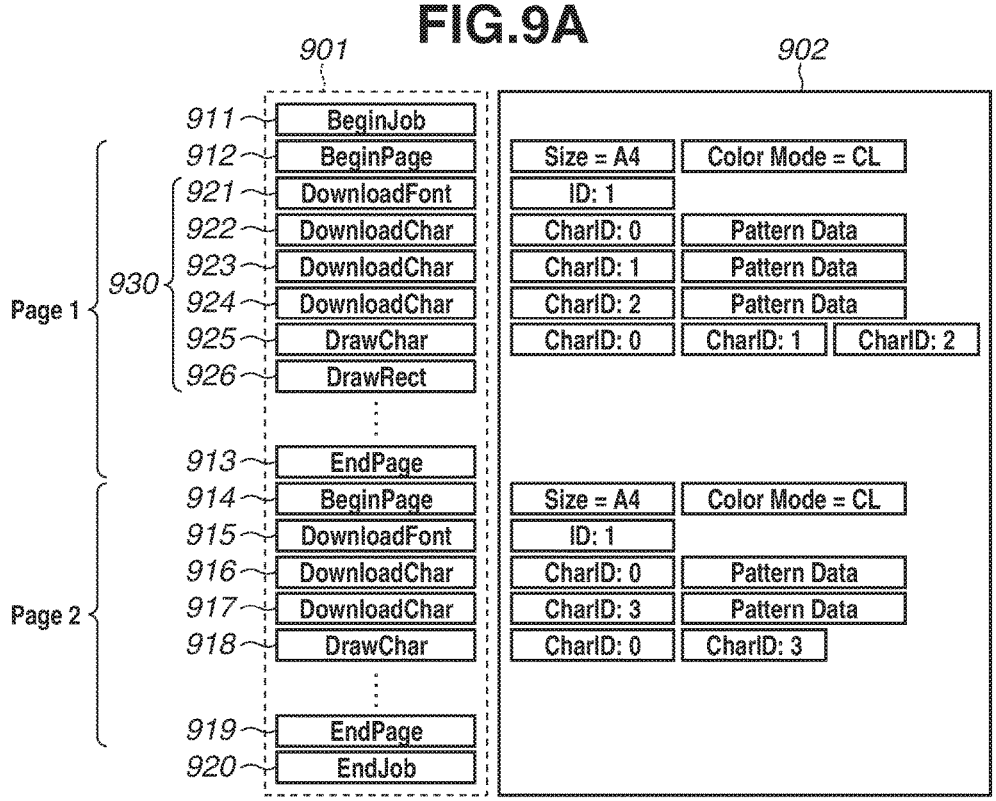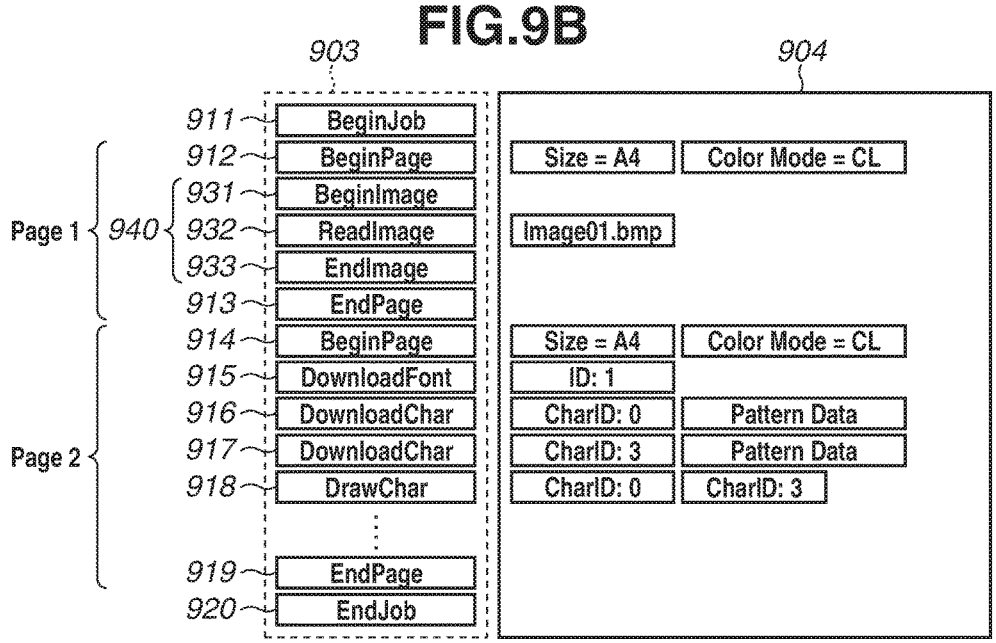

FIG.10A

| | 1001 | 1002 | 1003 | 1004 | 1005 | 1006 | 1007 | 1008 | 1009 |
|---|---|---|---|---|---|---|---|---|---|
| 1000 | Apparatus ID | Apparatus Type | Address | Color/ Monochrome | Output Size | Resolution | Engine Speed | Transfer Speed | Status |
| | 101 | printing apparatus | aaa.bbb.ccc.ddd | color | A4 | 300 × 300 dpi | 50 sheets/min. | 1024 KByte/sec. | online |
| | 102 | printing apparatus | ppp.qqq.rrr.sss | color | A3 | 600 × 600 dpi | 40 sheets/min. | 1024 KByte/sec. | online |
| | 103 | printing apparatus | iii.jjj.kkk.lll | monochrome | A4 | 300 × 300 dpi | 35 sheets/min. | 1024 KByte/sec. | online |

FIG.10B

| | 1011 | 1012 | 1013 | 1014 | 1015 | 1016 | 1017 | 1018 |
|---|---|---|---|---|---|---|---|---|
| 1010 | Job ID | User ID | Storage Place | Setting Information | Number of Pages | PDL Type | Rendering Time (Estimation) | Preceding Process |
| | 1 | 12345 | file name: AAAAA.doc saving location: 1 | color mode: monochrome print mode: one-sided ... | 10 | PCL | 1 page: 12.8 sec. 2 page: 1.1 sec. 3 page: 0.7 sec. ... 9 page: 11.7 sec. 10 page: 0.6 sec. | 1 page: ○ 2 page: × 3 page: × ... 9 page: ○ 10 page: × |
| | 2 | 12345 | file name: BBBBB.doc saving location: 2 | color mode: color print mode: two-sided ... | 5 | LIPS LX | 1 page: 0.6 sec. 2 page: 0.7 sec. 3 page: 50.2 sec. 4 page: 1.1 sec. 5 page: 8.1 sec. | 1 page: × 2 page: ○ 3 page: × 4 page: × 5 page: ○ |

USE OF SAVED FILES

SELECT FILE AND SPECIFY USE PURPOSE.

BOX /00:

| ✓ TYPE | NAME | SHEET SIZE | PAGE | DATE/TIME ▲ |
|---|---|---|---|---|
| 1 | 20131021115312 | A4 | 1 | 10/21 11:53 |
| 2 | 20131021115433 | A4 | 1 | 10/21 11:54 |

*1111*

1/1

TO TOP  UPDATE  TOTAL: 2  SELECTED FILES: 2

CANCEL SELECTION  PRINT LIST

DETAILED INFORMATION | DISPLAY IMAGE | EDIT FILE | TRANSMIT | PRINT

RESERVATION PRINTING

| DOCUMENT NAME | INPUT TIME | PRECEDING PROCESS | ESTIMATED PROCESSING TIME |
|---|---|---|---|
| material1.doc | 18:05 | PROCESSED | 1 MIN. |
| material2.doc | 18:06 | IN PROCESS | 1-2 MIN. |
| material3.doc | 18:07 | UNPROCESSED | 2 MIN. |

*1121*

LOGIN/USER A     PRINT SETTINGS     START PRINTING

*1123*       *1122*

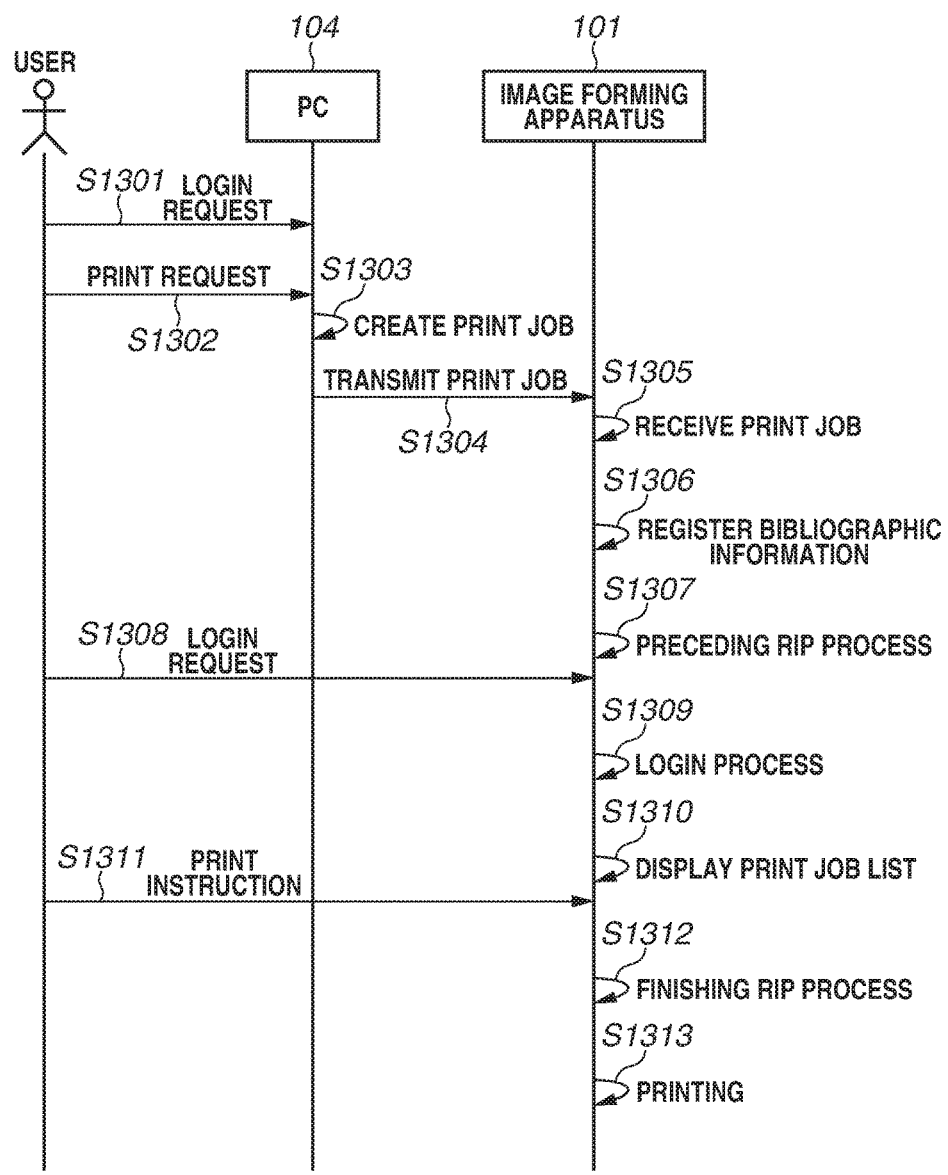

IMAGE PROCESSING APPARATUS AND METHOD TO FORM IMAGE ON SHEET USING PAGE IMAGE DATA AND OBJECT INFORMATION

BACKGROUND OF THE INVENTION

Field of the Invention

One disclosed aspect of the embodiments relates to an image forming system for forming an image on a sheet. The image forming system includes an image forming apparatus for forming an image on a sheet, and an image processing apparatus capable of communicating with the image forming apparatus. The image forming apparatus is used as, for example, a copying machine, a printer, a fax, and a multi-function peripheral having a plurality of functions of these apparatuses.

Description of the Related Art

With the spread of a network environment in recent years, generally, an image forming system using an image forming apparatus such as a printer manages print data in a server (an image processing apparatus). Japanese Patent Application Laid-Open No. 2011-257799 discusses an image forming system where a server acquires print data from a personal computer (PC) and transmits the print data to a printer. The server discussed in Japanese Patent Application Laid-Open No. 2011-257799 can perform either one of the process of, according to a transmission request from the printer, rendering the entirety of page description language (PDL) data and then transmitting image data, and the process of transmitting original PDL data without rendering the original PDL data.

As described above, the server discussed in Japanese Patent Application Laid-Open No. 2011-257799 is configured to perform either one of the process of rendering PDL data and then transmitting image data, and the process of transmitting original PDL data. Thus, the server has the following problem. It is not possible to both improve the performance of the printer and reduce a data size. The cause of the problem is specifically described below.

Normally, in a case where image data is generated based on PDL data, the data size of the image data is larger than the data size of the PDL data based on which the image data is generated. If so, an adverse effect may result from the strained storage capacity of the server or the reduced transfer speed to the printer. If, on the other hand, the server discussed in Japanese Patent Application Laid-Open No. 2011-257799 transmits PDL data to the printer as it is, the printer needs to analyze the PDL data by itself. Thus, an adverse effect may result from the decreased speed of printing due to the time spent to analyze the PDL data. Accordingly, in either case, the performance of the printer suffers.

SUMMARY OF THE INVENTION

In view of the above problem, one disclosed aspect of the embodiments is directed to providing an image processing apparatus capable of improving the performance of an image forming apparatus with reduced data size.

According to an aspect of the embodiments, an image processing apparatus, which is capable of transmitting print data to an image forming apparatus for forming an image on a sheet based on print data, includes one or more controllers. The one or more controllers are configured of including at least one processor or at least one circuit having a function. The one or more controllers are configured to perform a process of acquiring particular print data, a process of acquiring first page image data, and a process of acquiring transmitted print data. The particular print data includes a plurality of pieces of page information. The plurality of pieces of page information includes at least first page information including a plurality of pieces of first object information and second page information including a plurality of pieces of second object information The process of acquiring the first page image data is based on the plurality of pieces of object information in the first page information. The transmit print data may be transmitted to the image forming apparatus and at least includes the first page image data and the second page information.

Further features of the disclosure will become apparent from the following description of exemplary embodiments with reference to the attached drawings.

BRIEF DESCRIPTION OF THE DRAWINGS

FIG. 1 is a diagram illustrating an image forming system.

FIG. 7 is a diagram illustrating a flowchart of a specifying process.

FIG. 8A is a diagram illustrating a printer driver screen. FIG. 8B is a diagram illustrating a structure of print data.

FIG. 9A is a diagram illustrating a structure of page description language (PDL) data before a preceding RIP process. FIG. 9B is a diagram illustrating the structure of the PDL data after the preceding RIP process.

FIG. 10A is a diagram illustrating a device information database (DB). FIG. 10B is a diagram illustrating a bibliographic information DB.

FIG. 11A is a diagram illustrating a screen for using saved data. FIG. 11B is a diagram illustrating a screen for using reserved data.

FIG. 13 is a diagram illustrating a processing sequence of the image forming system according to the second exemplary embodiment.

DESCRIPTION OF THE EMBODIMENTS

Figure 2A:
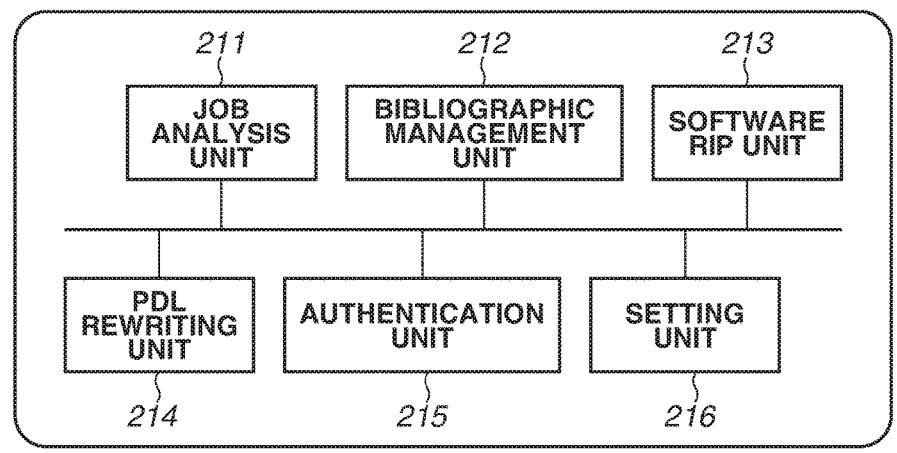
FIG. 2A is a block diagram illustrating a software configuration of a server.

An exemplary embodiment of the disclosure will be specifically described below using exemplary embodiments. In the exemplary embodiments, a description is given of a printing system (an image forming system) in which a printing process is performed on a sheet (a recording material) by forming an image based on print data. The exemplary embodiment of the disclosure is not limited to the configurations described in the exemplary embodiments. Part or all of the configurations of the exemplary embodiments may be replaced with equivalents to the extent that the effects of the disclosure are obtained.

In a first exemplary embodiment, a description is given of a printing system in which print data transmitted from a personal computer (PC) is temporarily accumulated in a server, and the print data is downloaded to a printer for printing of the print data.

[Printing System]

FIG. 1 is a diagram illustrating an image forming system 1. The printing system 1 includes a server 105, printing apparatuses (image forming apparatuses) 101, 102, and 103, and a PC (host computer) 104. These apparatuses are connected to each other via a local area network (LAN) 5, such as Ethernet (registered trademark), so that the apparatuses can communicate with each other.

In the printing system 1, print data (a print job) output from the PC 104 is temporarily accumulated in the server 105 and downloaded to any of the printing apparatuses 101, 102, and 103. The printing apparatus 101, 102, or 103 forms an image based on the downloaded or received print data.

The PC 104 is a general computer that functions as an external apparatus of the printing apparatuses 101, 102, and 103. The PC 104 includes a controller (not illustrated) including a read-only memory (ROM), a random-access memory (RAM), and a central processing unit (CPU) and performs information processing based on a program. The description of the specific configuration of the PC 104 is omitted. The PC 104 can be used by a user logging into an operating system (OS). The PC 104 executes a printer driver to generate print data in a page description language (PDL) data format based on document data (a document). PDL data is PDL format data that is described in a PDL and can be interpreted by the printing apparatuses 101, 102, and 103 and the server 105.

The server 105 is an information processing apparatus (e.g., an image processing apparatus) for managing information of print data. The details of the server 105 will be described below. The server 105 stores and manages print data transmitted from the PC 104. Further, the server 105 transmits print data according to a request from any of the printing apparatuses 101, 102, and 103.

Each of the printing apparatuses 101 to 103 is an apparatus for performing printing on a sheet (a recording material) based on print data. Each of the printing apparatuses 101 to 103 can request print data from the server 105. Further, each of the printing apparatuses 101 to 103 can receive print data transmitted from the PC 104. In the present exemplary embodiment, a case is described where each of the printing apparatuses 101 to 103 acquires print data from the server 105. Each of the printing apparatuses 101 to 103 may be a multifunction peripheral or a multifunction printer (MFP), or may be a single-function printer (SFP).

[Image Forming Sequence]

Figure 3:
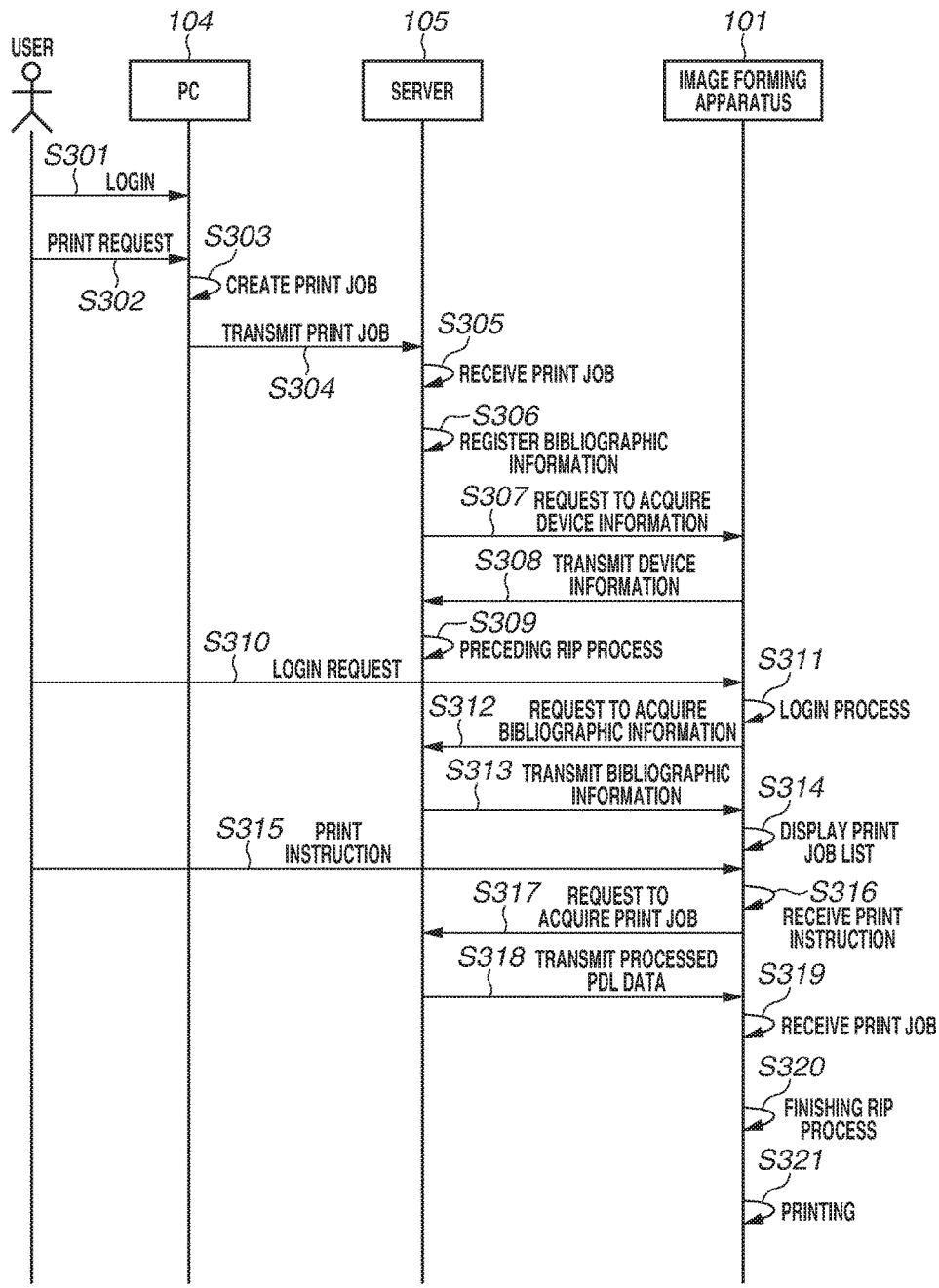
FIG. 3 is a diagram illustrating a processing sequence of the image forming system.

A description is given of an entire sequence in a case where printing is performed using the printing system 1. FIG. 3 is a diagram illustrating the processing sequence of the image forming system. In the present exemplary embodiment, a case is described where the server 105 stores print data transmitted from the PC 104, and the user causes the printing apparatus 101 to print the stored print data. The server 105 has the function of performing an analysis process and a conversion process on received print data in advance before a request for the print data is transmitted from any of the printing apparatuses 101 to 103. This process is referred to as a "preceding raster image processor (RIP) process". The details of the preceding RIP process will be described below.

To start an image forming sequence, first, in step S301, the user makes a login request to the PC 104. In the login request, the user inputs user information, such as a user account name, and authentication information, such as a password. The PC 104 performs a login process of the user based on the information input by the user. The logged-in user specifies a document to be printed and gives an instruction to execute the printer driver. If the printer driver starts, then in step S302, the user specifies the transmission destination and the print settings of print data and then gives a print instruction. In the present exemplary embodiment, the user specifies the server 105 as the transmission destination of the print data. In step S303, based on the specified document, the specified print settings, and the user information of the logged-in user, the PC 104 creates print data. The created print data has a structure as illustrated in FIG. 8B. If creating the print data, then in step S304, the PC 104 transmits the print data to the server 105. If the print data is sent, then in step S305, the server 105 performs a reception process for receiving the print data. Receiving the print data, then in step S306, the server 105 registers bibliographic information regarding the received print data in a bibliographic information database (DB). If the bibliographic information is registered, then in step S307, before performing a preceding RIP process, the server 105 requests device information from each printing apparatus connected to the server 105. The device information is, for example, spec information and status information of the device. If acquiring the device information, then in step S308, the server 105 registers the acquired device information in a device information DB as illustrated in FIG. 10A. FIG. 10A is a diagram illustrating the device information DB. Then, in step S309, the server 105 performs a preceding RIP process on the print data received in step S305.

Then, in step S310, the user makes a login request to any of the printing apparatuses 101, 102, and 103. A case is described where the user logs into the printing apparatus 101. If the user makes a login request to the printing apparatus 101, then in step S311, the printing apparatus 101 performs a login process according to the login request. If the login is successful, then in step S312, the printing apparatus 101 requests bibliographic information associated with the logged-in user from the server 105. If receiving the request, then in step S313, the server 105 transmits the bibliographic information to the printing apparatus 101. Acquiring the bibliographic information from the server 105, then in step S314, the printing apparatus 101 displays a job list for the logged-in user. Confirming the displayed print data list, then in step S315, the user selects print data to be printed and gives a print instruction. In step S316, the printing apparatus 101 receives the print instruction from the user. In step S317, the printing apparatus 101 makes to the server 105 a transmission request to transmit the print data. Receiving the transmission request, then in step S318, the server 105 transmits the PDL data preceding-RIP-processed in step S309 to the printing apparatus 101. If the print data is transmitted, then in step S319, the printing apparatus 101 performs a reception process for receiving the print data. Then, in step S320, the printing apparatus 101 performs a finishing RIP process on the preceding-RIP-processed print data. Further, in step S321, the printing apparatus 101 performs printing based on image data generated by the finishing RIP process.

[Printer Driver]

As described above, the printer driver is used in a case where the PC 104 transmits print data. An operation screen for operating the printer driver is as illustrated in FIG. 8A, for example. FIG. 8A is a diagram illustrating a setting screen for setting printing in the printer driver. A setting screen 810 can be called after a document to be printed and an output destination are specified. On the setting screen 810, various print settings can be specified. Examples of items that can be set include an output method 814, a document size, an output sheet size, the number of copies, the orientation of printing, and a preceding process setting 811.

As the output method 814, one of "print", "save", and "secure" can be set. The output method "print" is a setting for permitting the output destination of the print data to immediately print the print data. The output method "save" is a setting for causing the output destination of the print data to save the print data (or image data based on the print data) in a specified folder (directory). The output method "secure (reserve)" is a setting for specifying that the output destination of the print data save the print data. Further, in the output method "secure", a password can be set. If a password is set, the output destination is permitted to print the print data after the password is authenticated.

As the preceding process setting 811, the on/off state of a preceding process function can be set. After print settings are made, and if an OK button 812 is selected, the print settings are set or reflected. If a cancel button 813 is selected, the print settings are not set or reflected, and setting ends. Then, if a transmission instruction is given on a print data transmission screen (not illustrated), the print data is transmitted to the specified output destination. In the present exemplary embodiment, the print data is transmitted to the server 105.

The print data transmitted from the PC 104 to the server 105 has a structure illustrated in FIG. 8B. FIG. 8B is a diagram illustrating the structure of the print data. Print data 820 includes a header portion 821 and a PDL portion 822. The header portion 821 stores user information and print setting information. The PDL portion 822 stores drawing commands included in each page, such as P1, Line1, and Text1. P1 included in a first page of the print data 820 represents a drawing range [A, B] of the entirety of the page. Line1 represents a straight line connecting coordinates (x1, y1) and coordinates (x'1, y'1). Text1 represents drawing text "abc" from coordinates (x2, y2) in a character size (size=12). Rect1 is a command for drawing a rectangle and represents a rectangle including upper left coordinates (x3, y3) and lower right coordinates (x'3, y'3). Image1 represents drawing an image with the origin at coordinates (x4, y4). Each page of the PDL portion thus includes a plurality of PDL commands. In the present exemplary embodiment, a user name is used as information for identifying the user. Alternatively, a user identification (ID) may be used.

[Mechanical Configuration of Server]

As illustrated in FIG. 1, the server 105 includes a controller 150. The controller 150 is a control unit or circuit for performing overall control of the entirety of the server 105 based on a program. The controller 150 includes a network interface (I/F) 160, a central processing unit (CPU) 161, a hard disk drive (HDD) 164, a random access memory (RAM) 162, and a read only memory (ROM) 163. The components in the controller 150 are connected to each other by a system bus 166 so that the components can communicate with each other. The controller 150 may include a single substrate (board), or may include a plurality of substrates (boards).

The network I/F 160 is a communication interface for inputting and outputting information to and from an external apparatus via the LAN 5. As the network I/F 160, for example, a LAN card compatible with the Transmission Control Protocol/Internet Protocol (TCP/IP) is used.

The CPU 161 is a processor or a programmable device for making calculations for various types of control. The CPU 161 may execute programs or instructions that cause the CPU 161 to perform operations as described in the following. The HDD 164 is a storage unit for storing system software and various types of data, such as print data and image data. The HDD 164 can store PDL data.

The RAM 162 is a system work memory used as a work area for the CPU 161. Further, the RAM 162 functions as an image memory for temporarily storing print data and image data. It may also store programs or instructions that are transferred or downloaded from the HDD 164 or other non-volatile memories.

The ROM 163 is a memory storing various programs including a boot program for a system. The ROM 163 may also store programs or instructions that, when executed by the CPU 161, cause the CPU 161 to perform operations as described in the following.

[Software Configuration of Server]

The controller 150 executes various programs to function as various function units, modules, functions, processes, or other program structures. Specifically, the functions are achieved by loading a program stored in the ROM 163 or the HDD 164 into the RAM 162, and by the CPU 161 executing the program. FIG. 2A is a diagram illustrating the functional blocks of the controller 150. As illustrated in FIG. 2A, the controller 150 includes as the function units a job analysis unit 211, a bibliographic management unit 212, a software RIP unit 213, a PDL rewriting unit 214, an authentication unit 215, and a setting unit 216. The term "unit" here refers to a basic program structure that performs a specified function. Thus, a "unit" may be equivalent to a function, a module, a process, a method, a routine, an application, or any other construct or structure that includes instructions that, when executed by a processor (e.g., the CPU 161), cause the processor to perform operations described in the following. A configuration in which an external apparatus connected to the server 105 executes part or all of program processing for achieving the function units, i.e., a so-called cloud configuration, may be employed.

The job analysis unit 211 is a function unit for analyzing received print data to acquire information. The job analysis unit 211 acquires a user name, a document name, and print setting information from the header portion 821 of the print data, as information for creating bibliographic information for one record.

Further, the job analysis unit 211 analyzes the PDL portion 822 to acquire estimation information of the time required for rendering. The time is estimated, for example, based on the size of the print data, the number of PDL commands included in the print data, and the type of the print data. The information obtained by the job analysis unit 211 is stored in association with the print data in the bibliographic information DB.

The bibliographic management unit 212 is a function unit for managing information regarding print data in the bibliographic information DB. Information to be registered in the bibliographic information DB is acquired by the job analysis unit 211. The bibliographic information DB stores a job ID, a user name (user information), a file name (a document name), print settings, an input time, and an analysis status in association with a single piece of print data.

The software RIP unit 213 is a function unit for interpreting PDL commands to generate image data. Since the software RIP unit 213 is achieved by a program, the software RIP unit 213 can perform more flexible processing than the RIP circuit 128, which is a dedicated circuit, does. For example, the software RIP unit 213 can render not all the pages but only a particular page. Further, the software RIP unit 213 can suspend rendering and save an intermediate result.

The PDL rewriting unit 214 is a function unit for rewriting commands described in PDL data. The PDL rewriting unit 214 functions as a PDL generation unit for generating processed PDL data.

The authentication unit 215 is a function unit for allowing an administrative user to log into the server 105. It is possible to log into the server 105 from a dedicated operation terminal (not illustrated) or the PC 104. The administrative user logs into the server 105 and thereby can change various settings of the server 105.

The setting unit 216 is a function unit for managing various settings of the server 105. Setting information can be changed from a prescribed value by an operation of the administrative user. If a setting is changed, a management flag (e.g., a setting value) corresponding to the content of the setting is rewritten. In the present exemplary embodiment, a forced preceding RIP setting can be turned on and off. The operation mode of the controller 150 is switched by changing the setting.

[Configuration of Printing Apparatus]

A description is given of the configuration of a printing apparatus for achieving the above image forming sequence. The configurations of the printing apparatuses 101, 102, and 103 are similar to each other. Thus, only the configuration of the printing apparatus 101 is described on behalf of the printing apparatuses 101, 102, and 103, and the description of the printing apparatuses 102 and 103 is omitted.

[Mechanical Configuration of Printing Apparatus]

As illustrated in FIG. 1, the printing apparatus 101 includes a controller 110 (a control unit), a print mechanism 111 (a print unit, an image forming unit), a card reader 112 (an authentication unit), and an operation panel 113 (an operation unit, a display unit).

The print mechanism 111 is a mechanism for forming an image on a sheet. The print mechanism 111 functions as an image forming unit. As the print mechanism 111, for example, an electrophotographic mechanism or an ink-jet mechanism can be used.

The card reader 112 is a unit for reading authentication information for user authentication from a storage medium, such as an integrated circuit (IC) card owned by the user. Another device such as a fingerprint reader may be used instead of the card reader 112 so long as the device can acquire authentication information. If reading authentication information from a card, the card reader 112 outputs the read authentication information to the controller 110.

The operation panel 113 (an operation unit) is a reception unit and a user interface for notifying the user of information and receiving an instruction from the user. The operation panel 113 includes an input unit 113b (an operation unit), such as input keys or a touch screen, with which the user provides an input, and a notification unit 113a (a display unit, a notification unit), such as a liquid crystal panel or a loudspeaker, which notifies the user of information by light or sound. The operation panel 113 outputs, to the controller 110, input information from the user and receives, from the controller 110, notification information to the user.

The controller 110 is a control unit for performing overall control of the entirety of the printing apparatus 101 based on a program. The controller 110 includes a network I/F 120, a reader I/F 121, a panel I/F 122, a CPU 123, an HDD 124, a RAM 125, a ROM 126, a device I/F 127, a RIP circuit 128, and an image processing circuit 129. The components in the controller 110 are connected to each other by a system bus 130 so that the components can communicate with each other. The controller 110 may include a single substrate (board), or may include a plurality of substrates (boards).

The network I/F 120 is a communication interface for inputting and outputting information to and from an external apparatus via the LAN 5. As the network I/F 120, for example, a LAN card compatible with TCP/IP is used.

The reader I/F 121 is an interface for inputting and outputting information to and from the card reader 112.

The panel I/F 122 is an interface for inputting and outputting information to and from the operation panel 113.

The CPU 123 is a processor or a programmable device for making calculations or performing operations for various types of control. The HDD 124 is a storage unit, device, or circuit for storing system software and various types of data, such as print data and image data. The HDD 124 can store PDL data.

The RAM 125 is a system work memory used as a work area for the CPU 123. Further, the RAM 125 functions as an image memory for temporarily storing print data and image data.

The ROM 126 is a memory storing various programs including a boot program for a system.

The device I/F 127 is an interface for inputting and outputting information to and from the print mechanism 111. The device I/F 127 performs synchronous-to-asynchronous or asynchronous-to-synchronous conversion when the print mechanism 111 and the controller 110 communicate image data to each other.

The RIP circuit 128 is a circuit or a device for analyzing drawing commands (PDL commands) or intermediate data (a display list) included in print data, to rasterize the print data into an image. As the RIP circuit 128, a dedicated circuit (hardware) for generating an image based on input print data can be used. Using a dedicated circuit for consistently processing pages from the first page to the last page in page order, it is possible to generate images at high speed. In the present exemplary embodiment, the rendering efficiency of the RIP circuit 128 is much higher than that of the software RIP unit 213. In other words, the rendering speed of the RIP circuit 128 is faster than that of the software RIP unit 213. In the present exemplary embodiment, the rendering speed of the RIP circuit 128 is twice the rendering speed of the software RIP unit 213.

In the printing system 1, the software RIP unit 213 is used as a first image generation unit and the RIP circuit 128 is used as a second image generation unit.

The image processing circuit 129 acquires image data generated by the RIP circuit 128 and performs a correction process and a resolution conversion process on the image data based on apparatus information of the print mechanism 111. The corrected and converted image data is transmitted to the print mechanism 111 via the device I/F 127.

[Software Configuration of Printing Apparatus]

Figure 2B:
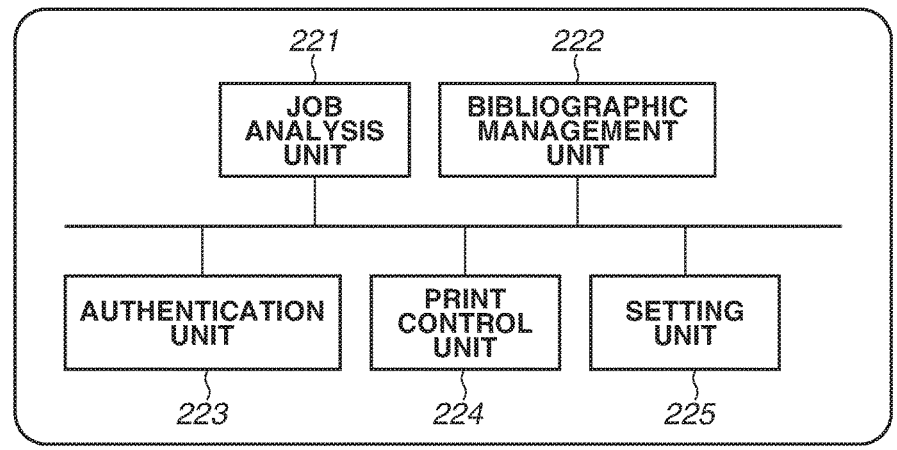
FIG. 2B is a block diagram illustrating a software configuration of an image forming apparatus.

The controller 110 executes various programs to function as various function units. Specifically, the functions are achieved by loading a program stored in the ROM 126 or the HDD 124 into the RAM 125, and by the CPU 123 executing the program. FIG. 2B is a diagram illustrating the functional blocks of the controller 110. As illustrated in FIG. 2B, the controller 110 includes a job analysis unit 221, a bibliographic management unit 222, an authentication unit 223, a print control unit 224, and a setting unit 225, as the function units. A configuration in which an external apparatus connected to the printing apparatus 101 executes part or all of program processing for achieving the function units, i.e., a so-called cloud configuration, may be employed.

The job analysis unit 221 is a function unit for analyzing received print data to acquire information.

The bibliographic management unit 222 is a function unit for managing information regarding print data in a bibliographic information DB. Bibliographic information to be registered in the bibliographic information DB is acquired from the server 105 when the user logs into the printing apparatus 101.

The authentication unit 223 is a function unit for performing a login process of the user operating the printing apparatus 101. In the login process, the authentication unit 223 confirms whether information in a user DB stored in advance in the HDD 124 matches user information input by the user. If the stored information matches the user information, the authentication unit 223 permits the logged-in user to operate the printing apparatus 101 in the scope of authority registered in the user DB. In a case where card authentication is used, the user information is input from the card reader 112. In a case where keyboard authentication (password authentication) is used, the user information is input from the operation panel 113.

The print control unit 224 is a function unit for controlling the print mechanism 111. The print control unit 224 controls the print mechanism 111 based on setting information of the apparatus and print settings.

The setting unit 225 is a function unit for managing various settings of the printing apparatus 101. It is assumed that setting information has been input in advance by the administrative user. The setting information can be changed by the administrator through the operation panel (input unit) 113. If a setting is changed, a management flag (a setting value) corresponding to the content of the setting is rewritten.

[Print Instruction Screen]

The printing apparatus 101, which performs printing based on a print instruction from the user, has a plurality of functions regarding printing. The user uses the functions of the printing apparatus 101 by operating the operation panel 113.

One of the plurality of functions is a box function. The box function is the function of managing print data and image data on a folder-by-folder (directory-by-directory) basis. The box function can save print data which is transmitted from the PC 104 and for which "save" is specified, and image data read from a document using a scanner (not illustrated). FIG. 11A is a diagram illustrating a screen for using saved data.

To use the box function, the user operates the operation panel 113 to display a box screen 1110. On the box screen 1110, it is possible to give an instruction to use a file saved in the printing apparatus 101. The box screen 1110 includes a job list 1111 and a print instruction button 1112. The job list 1111 is a list of jobs saved in a specified box. In FIG. 11A, a list of jobs saved in "/00:" is displayed. The print instruction button 1112 is a button for giving an instruction to execute the printing of a job selected from the job list 1111. On the box screen 1110, it is possible to give a transmission instruction to transmit a job using email and a display instruction to display a preview image in addition to a print instruction.

Another one of the plurality of functions is a reservation printing function. The reservation printing function is the function of using print data reserved in the server 105 for printing. FIG. 11B is a diagram illustrating a screen for using reserved data.

To use the reservation printing function, the user operates the operation panel 113 to display a reservation printing screen 1120. On the reservation screen 1120, it is possible to give an instruction to use a file saved in the server 105. The reservation screen 1120 includes a job list 1121, a print instruction or start printing button 1122, and a print setting button 1123. The job list 1121 is a list of jobs saved in the server 105. In this case, only jobs associated with a user A, who is currently logged in, are displayed. The print instruction button 1122 is a button for giving an instruction to execute the printing of a job selected from the job list 1121. The print setting button 1123 is a button for giving an instruction to change the print settings of a job selected from the job list 1121.

In the list 1121, in addition to the document name and the input time of print data, the preceding process state and the estimated processing time of the print data are indicated. The preceding process state indicates the state of the print data in the server 105. "Processed" indicates that the print data has already been preceding-RIP-processed. "In process" indicates that the print data is being preceding-RIP-processed. "Unprocessed" indicates that the print data has not yet been preceding-RIP-processed. The estimated processing time indicates an estimated time from the start to the completion of printing. The estimated processing time of "material1.doc", of which the preceding process state is "processed", is one minute, which is relatively short. The estimated processing time of "material3.doc", of which the preceding process state is "unprocessed", is two minutes, which is relatively long. The processing time of "material2.doc", of which the preceding process state is "in process", has not yet been finalized. Thus, the estimated processing time is specified in the range of one to two minutes based on the estimated time before a preceding RIP process and the estimated time after a preceding RIP process.

The estimated time is derived based on a rendering time field 1017 and a preceding process field 1018 of a bibliographic information DB 1010 shown in FIG. 10B, and performance information of the RIP circuit 128. The performance of the RIP circuit 128 varies depending on the model. Thus, even if print data is the same, but if an apparatus into which the user logs is different (e.g., if the user logs into the printing apparatus 102 or 103), the estimated time has a different value.

[Control Process of Server]

A detailed description is given of the processing contents of main processes executed by the server 105 among the processes illustrated in the image forming sequence. These processes are executed by the controller 150 (particularly, the CPU 161).

[Job Reception Process]

Figure 4:
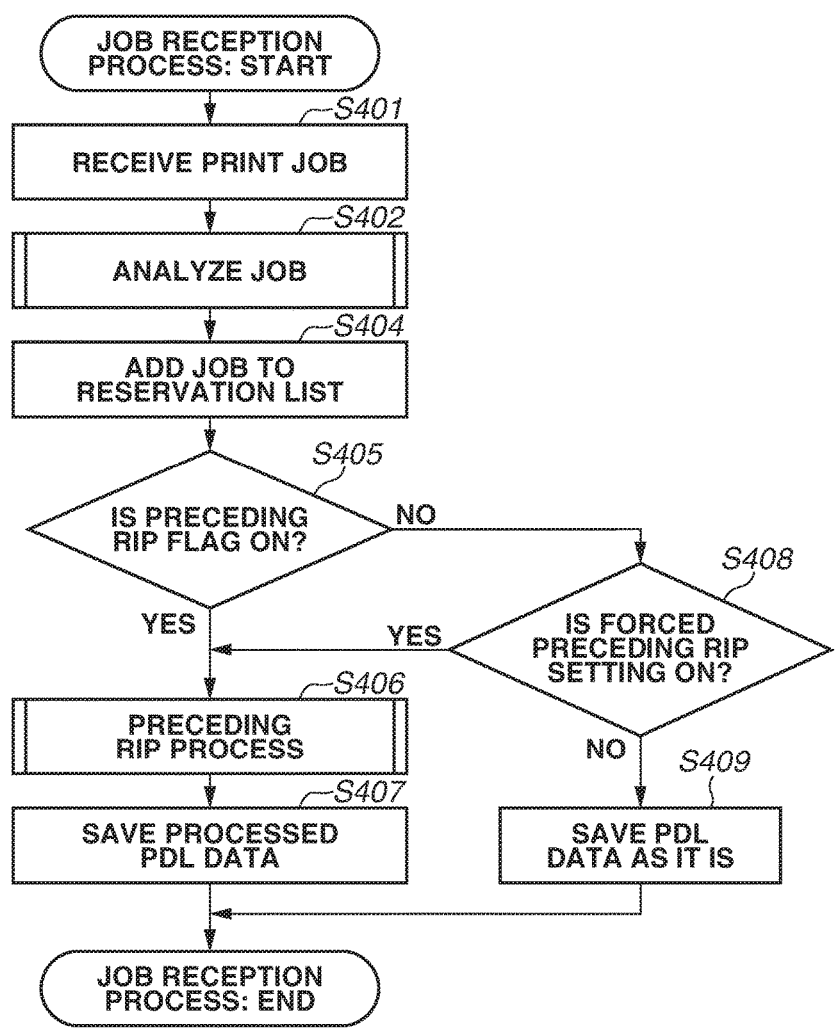
FIG. 4 is a diagram illustrating a flowchart of a job reception process.

According to the reception of the print data in step S305 in FIG. 3, the server 105 executes a job reception process. FIG. 4 is a diagram illustrating a flowchart of the job reception process described in detail below.

If the print data is transmitted from the PC 104 via a network such as the LAN 5, then in step S401, the controller 150 receives the print data using the network I/F 160. Next, in step S402, the controller 150 analyzes the print data in the PDL format using the job analysis unit 211.

The controller 150 functioning as the bibliographic management unit 212 registers the document name, user information, and the storage address of the print data in association with each other as bibliographic information of the print job in the bibliographic information DB. The saved bibliographic information and print data can be transmitted to the printing apparatuses 101 to 103 at this stage.

Then, in step S405, the controller 150 determines whether a preceding RIP flag assigned to the print data is on or off. In a case where the preceding RIP flag is on (YES in step S405), then in step S406, the controller 150 functioning as the software RIP unit 213 performs a preceding RIP process on the print data. The details of the preceding RIP process will be described below. In step S407, the controller 150 stores, for example in the HDD 164, processed PDL data obtained as a result of the preceding RIP process.

In a case where the preceding RIP flag is off (NO in step S405), then in step S408, the controller 150 determines whether the forced preceding RIP function is set. In a case where the forced preceding RIP setting is on (YES in step S408), then in step S406, the controller 150 performs a preceding RIP process on the print data. In a case where the forced preceding RIP setting is off (NO in step S408), then in step S409, the controller 150 stores the received print data in the HDD 164 without processing the print data.

A series of processes in the job reception process is performed as described above.

[Preceding RIP Process]

In step S309, the server 105 executes a preceding RIP process. The preceding RIP process is the process of performing a RIP process on print data in advance before a transmission request to transmit the print data is transmitted from any of the printing apparatuses 101 to 103. The RIP process is performed in advance, whereby it is possible to reduce the load of the RIP circuit 128 when printing is performed, and reduce the processing time for rendering. Thus, after the user gives a print instruction to any of the printing apparatuses 101 to 103, it is possible to reduce the waiting time until the user obtains a print product.

Figure 6:
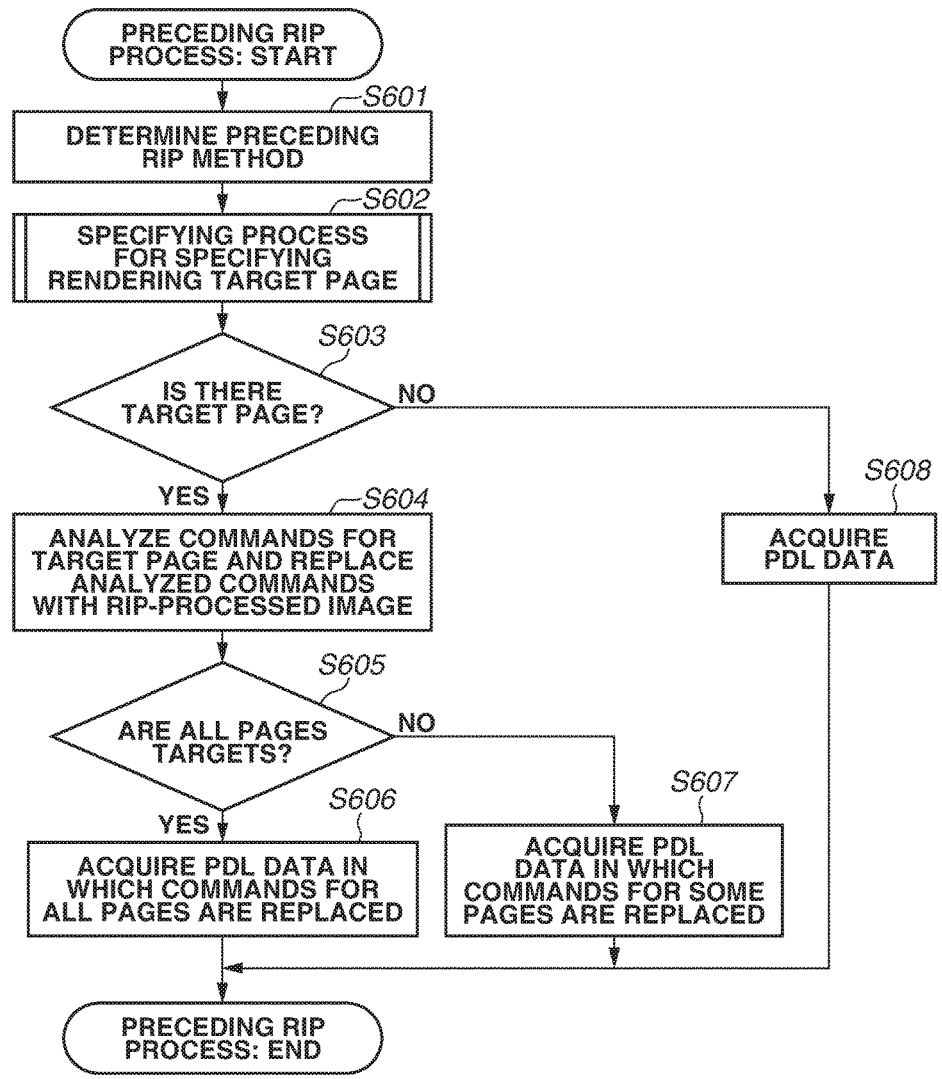
FIG. 6 is a diagram illustrating a flowchart of a preceding raster image processor (RIP) process.

The flow of the preceding RIP process is described in detail below. FIG. 6 is a diagram illustrating a flowchart of the preceding RIP process.

If the preceding RIP process is started, then in step S601, the controller 150 determines a preceding RIP method. Specifically, the controller 150 determines an image format (color or monochrome, an output size, and resolution) for use in replacing pages. The image format is determined based on the device information. FIG. 10A illustrates a device information DB 1000, which is stored in the HDD 164.

The device information DB 1000 includes an apparatus ID field 1001, an apparatus type field 1002, an address field 1003, a color/monochrome field 1004, an output size field 1005, a resolution field 1006, an engine speed field 1007, a transfer speed field 1008, and a status field 1009.

In the apparatus ID field 1001, an apparatus ID, which is identification information of each apparatus, is stored. In the apparatus type field 1002, type information of the apparatus is stored. In the address field 1003, address information of the apparatus is stored. In the color/monochrome field 1004, color/monochrome correspondence information of the apparatus is stored. In the output size field 1005, output size correspondence information of the apparatus is stored. In the resolution field 1006, resolution correspondence information of the apparatus is stored. In the engine speed field 1007, engine speed information of the apparatus is stored. In the transfer speed field 1008, transfer speed information of the speed of transfer to the apparatus is stored. In the status field 1009, status information of the apparatus is stored.

In the present exemplary embodiment, a plurality of printing apparatuses are connected to the server 105. Thus, print data stored in the server 105 can be printed by any of the plurality of printing apparatuses. Image formats with which the printing apparatuses are compatible are different from each other. Thus, it is desirable to determine the image format based on device information of an available printing apparatus. A case is described where it is determined that the printing apparatuses 101, 102, and 103 are available printing apparatuses. Among the printing apparatuses 101, 102, and 103, only an apparatus of which the status information stored in the status field 1009 indicates "online" may be determined as an available printing apparatus.

In the color/monochrome field 1004, a format having a great amount of information is a "color" format. In the output size field 1005, a format having the greatest amount of information is an "A3" format. In the resolution field 1006, a format having the greatest amount of information is a "600×600 dpi" format. Thus, the controller 150 determines "color", "A3", and "600×600 dpi" as the image format for use in the preceding RIP process. An image format having the greatest amount of information is thus used, whereby it is possible to prevent the deterioration of image quality, no matter which of the printing apparatuses the print data is transmitted to. A printing apparatus compatible with an image format having a small amount of information (e.g., the printing apparatus 101 or 103) performs conversion such as image reduction.

Next, in step S602, the controller 150 performs a specifying process for specifying a rendering target page.

In a case where there is a target page (YES in step S603), the controller 150 functioning as the software RIP unit 213 analyzes commands in a read page and performs rendering to generate image data of the page. Then, in step S604, the controller 150 functioning as the PDL rewriting unit 214 replaces drawing commands in the read page with reading commands in the generated image data. That is, in step S604, the controller 150 assigns the generated image data to the PDL data in an embedded manner. In a case where all the pages are processing targets (YES in step S605), then in step S606, commands in all the pages are replaced with image data. In a case where some of the pages are processing targets (NO in step S605), then in step S607, commands in only some of the pages are replaced with image data.

In a case where there is no target page (NO in step S603), then in step S608, the controller 150 does not generate an image, and does not rewrite commands in the PDL data, either.

A series of processes in the preceding RIP process is performed as described above.

[Specifying Process]

In step S602, the controller 150 performs a specifying process. FIG. 7 is a diagram illustrating a flowchart of the specifying process described in detail below.

In the specifying process, in step S701, the controller 150 reads a setting value to determine an ideal processing time per page. In the present exemplary embodiment, it is assumed that the setting value has been determined in advance before shipment from the factory. The setting value according to the present exemplary embodiment is a value (a predetermined time) regarding the time to be required to perform a rendering process by the software RIP unit 213.

After making the above determination, the controller 150 sequentially performs the following processes on all the pages of the PDL data. First, in step S702, the controller 150 analyzes commands in each page to estimate a rendering time. The controller 150 stores the result of the estimation in the rendering time field 1017. In a case where the estimated rendering time is longer than a predetermined time (e.g., 5 sec) (YES in step S703), the controller 150 registers the corresponding page as a page to be subjected to preceding rendering. In a case where the estimated rendering time is less than or equal to the predetermined time (e.g., 5 sec) (NO in step S703), the controller 150 does not register the corresponding page as a page to be subjected to preceding rendering. The controller 150 stores the determination result in the preceding process field 1018. As described above, determinations are made for all the pages of the PDL data.

According to the bibliographic information DB 1010, it is understood that in a job having ID "1", pages 1 and 9 are to be subjected to a preceding process, and in a job having ID "2", pages 3 and 5 are to be subjected to a preceding process. A preceding process is thus performed on only a page for which a rendering process is slow, whereby it is possible to efficiently improve the speed of a printing process. Further, not all the pages need to be replaced with images, and therefore, it is possible to reduce an increase in the size of print data. Thus, it is possible to reduce the tightness of the capacity of the HDD 164 of the server 105. Further, it is possible to reduce the transfer time for transmitting print data to the printing apparatus 101.

[PDL Processing Process]

In the present exemplary embodiment, PDL data is rewritten using image data generated in a preceding RIP process. The rewriting of the PDL data illustrated in step S604 is described in detail. FIG. 9A is a diagram illustrating the structure of the PDL data before the preceding RIP process. FIG. 9B is a diagram illustrating the structure of the PDL data after the preceding RIP process.

The PDL data includes commands and parameters added to each command. A command is defined in advance based on a PDL language specification. A parameter defines the content of the instruction of a command or the details of data. In a parameter, an item essential for each command and an initial value are determined, and there is an item that may be added as necessary.

As illustrated in FIG. 9A, the PDL data before the preceding RIP process includes a command group 901 and a parameter group 902. As illustrated in FIG. 9B, the PDL data after the preceding RIP process includes a command group 903 and a parameter group 904.

BeginJob 911 indicates the start of the job. EndJob 920 indicates the end of the job. BeginPage 912 indicates the start of a first page. EndPage 913 indicates the end of the first page. BeginPage 914 indicates the start of a second page. EndPage 919 indicates the end of the second page. That is, in this PDL data, PDL commands for two pages from BeginJob 911 to EndJob 920 have a hierarchical structure. Each page structure includes a command group for use in various drawing processes. In other words, the PDL data is print data including at least first page information having a plurality of pieces of object information and second page information having a plurality of pieces of object information. The first page of the command group 901 includes DownloadFont 921, DownloadChar 922 to 924, DrawChar 925, and DrawRect 926. The second page of the command group 901 includes DownloadFont 915, DownloadChar 916, DownloadChar 917, and DrawChar 918.

The first page of the command group 903 includes BeginImage 931, ReadImage 932, and EndImage 933.

Similarly to the second page of the command group 901, the second page of the command group 903 includes DownloadFont 915, DownloadChar 916, and DrawChar 918.

"DownloadFont" is a command for specifying a font for use in printing. "DownloadFont" has an ID for specifying a font and a font header, which is common data, as parameters.

"DownloadChar" is a command for registering font data on a character-by-character basis. "DownloadChar" has CharID for specifying a character, and pattern data representing a glyph shape as parameters. A command group for thus registering or deleting font data is referred to as "resource control commands".

"DrawChar" is a command for drawing a registered character pattern. "DrawChar" has CharID as a parameter.

"DrawRect" is a command for representing a graphic such as a rectangle.

BeginImage 931 indicates the start of an image. EndImage 933 indicates the end of the image. ReadImage 932 is a command for reading "image01.bmp". "image01.bmp" is image data generated based on a drawing command portion 930 of the first page. A set of three commands, namely BeginImage 931, ReadImage 932, and EndImage 933, can represent a single image. That is, the three commands can assign image data in a command format in the PDL data.

When FIGS. 9A and 9B are compared, it is understood that the drawing command portion 930 of the first page is replaced with an image command portion 940. The number of commands that need to be analyzed is thus reduced, whereby it is possible to reduce the load of an analysis process to be required for a rendering process. Further, "image01.bmp" is rendered image data. Thus, it is possible to reduce the load of rendering when printing is performed.

On the other hand, in the second page, the PDL data is not processed. In view of FIGS. 9A and 9B, it is understood that there is no difference in commands corresponding to page 2. As described above, drawing commands in a particular page are replaced with image commands, whereby it is possible to complete a RIP process on some pages in advance. Print settings, such as a size and a color mode, which are parameters specified by BeginPage 912, are maintained. These print settings may be changed based on an instruction from the user at the timing of actual printing. As described above, even in a case where commands in some pages are replaced with image commands, the original data format (PDL) is maintained as the data format. Thus, without a special configuration, the RIP circuit 128 of the printing apparatus 101 can perform a finishing RIP process on the PDL data in which commands are replaced.

The PDL data used in the above description is data of "resource inheritance level is page". The data of "resource inheritance level is page" is data in a format in which resources registered by resource control commands can be used only in the same page. Thus, "ID:1" and "CharID:0" are registered in page 1, and "ID:1" and "CharID:0" are registered again in page 2.

In contrast, there is data of "resource inheritance level is job". The data of "resource inheritance level is job" is data in a format in which resources registered by resource control commands can be used across a plurality of pages in the same job. Thus, if "ID:1" and "CharID:0" are registered in page 1, "ID:1" and "CharID:0" can be used in page 2 without registering "ID:1" and "CharID:0 again. That is, DownloadFont 915 and DownloadChar 917 become unnecessary. If, however, DownloadFont 921 and DownloadChar 922 are deleted in page 1, DrawChar 918 cannot be normally executed in page 2. Thus, in a case where data of "resource inheritance level is job" is processed, and even if the entirety of a page is replaced with image data, resource control commands necessary for another page should be left without being deleted. It is, however, difficult to identify resource control commands necessary for another page. Thus, all resource control commands may be maintained for data of "resource inheritance level is job". On the other hand, resource control commands may be deleted for data of "resource inheritance level is page".

[Instruction Reception Process]

Figure 5:
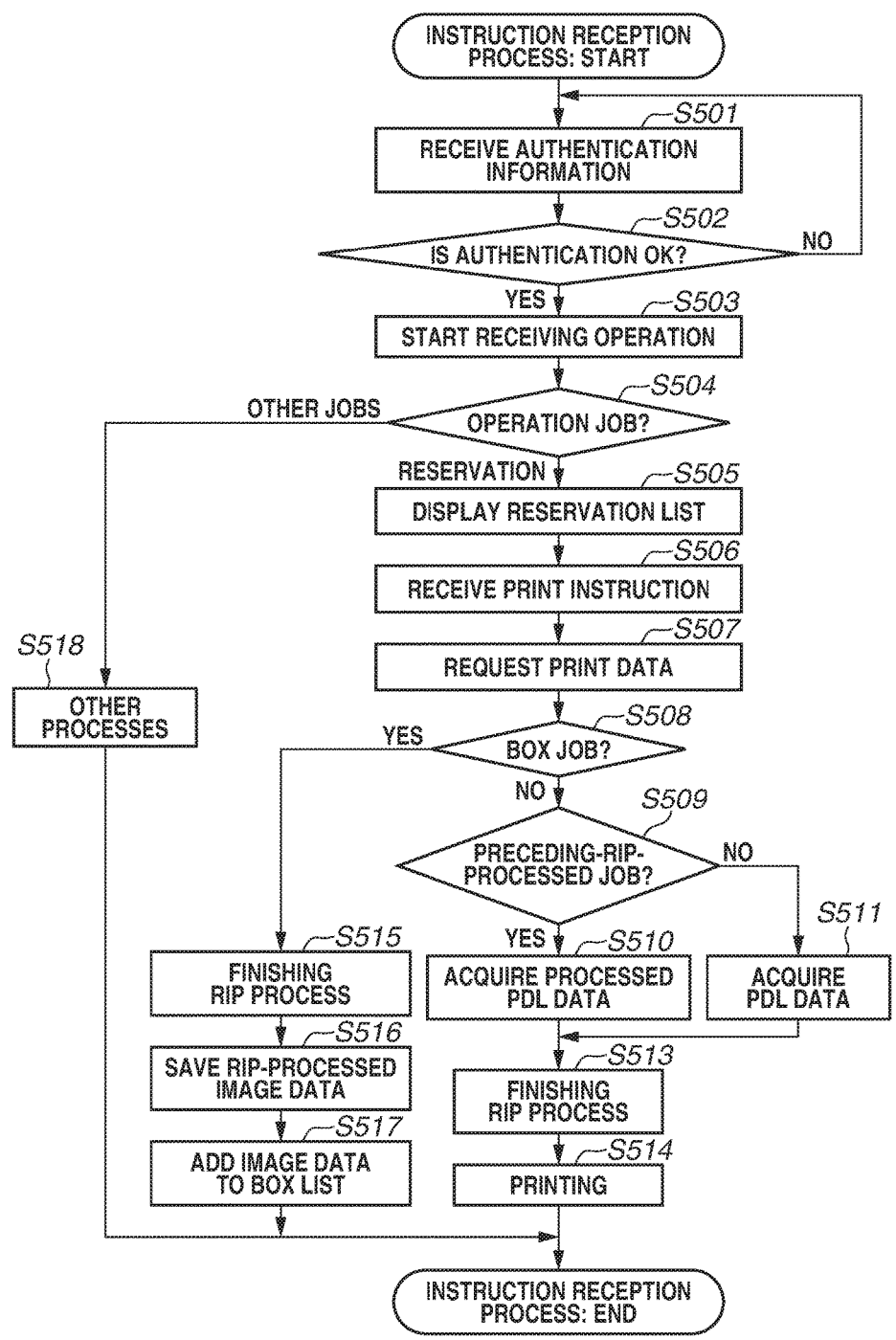
FIG. 5 is a diagram illustrating a flowchart of an instruction reception process.

According to the login of the user in step S310, the printing apparatus 101 executes an instruction reception process. FIG. 5 is a diagram illustrating a flowchart of the instruction reception process described in detail below.

If the user presses any of the input keys of the operation panel 113, then in step S501, the controller 110 displays a login screen (not illustrated) on the operation panel 113 and starts receiving authentication information. If authentication information is input from the card reader 112 or an input key while the login screen is displayed, the controller 110 determines authentication. In a case where user authentication is failed (NO in step S502), the controller 110 continues to receive authentication information. In a case where user authentication is successful (YES in step S502), then in step S503, the controller 110 reflects information regarding the authenticated user on applications. For example, based on the user information, the controller 110 acquires bibliographic information associated with the logged-in user from the server 105. Then, in step S504, the controller 110 permits the user to operate various functions (applications).

In a case where the user specifies an operation of any of other functions (step S504: OTHER JOBS), then in step S518, the controller 110 executes any of other processes, and the processing ends.

In a case where the user specifies an operation of the reservation function (step S504: reservation), the controller 110 displays the reservation screen 1120 on the operation panel 113. In step S505, on the reservation screen 1120, a list (identification information) of print data reserved in the server 105 is displayed. In the present exemplary embodiment, in the print data reserved in the server 105, only print jobs associated with the logged-in user are displayed in the list 1121. If a print job is selected, and the print instruction button 1122 is selected, then in step S506, the controller 110 receives the input of a print instruction. Then, in step S507, the controller 110 requests, from the server 105, print data for which the print instruction is given.

In a case where the selected print job is a box job (a job for which "save" is specified in the printer driver) (YES in step S508), then in step S515, the controller 110 acquires the print data and causes the RIP circuit 128 to perform a finishing RIP process on the print data. In step S516, the controller 110 saves, in the HDD 124, image data obtained by the RIP process. Then, in step S517, the controller 110 registers, in a box list, bibliographic information of the print data subjected to the finishing RIP process.

In a case where the selected print job is not a box job, but a preceding-RIP-processed job (NO in step S508, YES in step S509), then in step S510, the controller 110 acquires processed PDL data. Then, in step S513, the controller 110 performs a finishing RIP process on the PDL data using the RIP circuit 128.

In a case where the selected print job is not a box job, and not a preceding-RIP-processed job (NO in step S508, NO in step S509), then in step S511, the controller 110 acquires unprocessed PDL data. If acquiring the PDL data, then in step S513, the controller 110 transmits the PDL data to the RIP circuit 128 and performs a finishing RIP process on the PDL data. Acquiring image data subjected to the finishing RIP process, then in step S514, the controller 110 causes the image processing circuit 129 to correct an image and then transmits the image data to the print mechanism 111, to cause the print mechanism 111 to print the image data.

A series of processes in the instruction reception process is performed as described above.

[Effects]

According to the present exemplary embodiment, the server 105 can achieve a preceding RIP process. That is, the server 105 can perform a RIP process on print data before the user gives a print instruction. Thus, it is possible to reduce the waiting time for the user after the print instruction is given.

According to the present exemplary embodiment, it is possible to perform a preceding RIP process on only a page that needs a preceding RIP process, such as a page that requires time for rendering. In other words, a preceding RIP process according to the present exemplary embodiment is different from a box saving job in that not all the pages are rendered. Not all the pages are rendered, whereby it is possible to reduce the number of pieces of image data held after rendering, and reduce the data size. Thus, it is possible to reduce the tightness of the capacity of the HDD 164. Further, when data is transmitted to the printing apparatus 101, it is possible to reduce an increase in network traffic. Then, it is possible to contribute to an increase in the speed of transferring print data.

According to the present exemplary embodiment, using a driver on a PC side, a user can specify whether to perform a preceding RIP process. Thus, it is possible to appropriately perform a preceding RIP process on a job that needs a preceding RIP process.

According to the present exemplary embodiment, it is possible, based on the setting of a printing apparatus, to change whether to perform a preceding RIP process. Thus, it is not necessary to set whether to perform a preceding RIP process, with respect to each job on a printer driver side. This leads to excellent usability.

In the first exemplary embodiment, a description has been given of a printing system for temporarily accumulating, in a server, print data transmitted from a PC, downloading the print data to a printer, and printing the print data. In a second exemplary embodiment, a description is given of a printing system for causing a printer having a server function to process print data transmitted from a PC.

[Printing System]

Figure 12A:
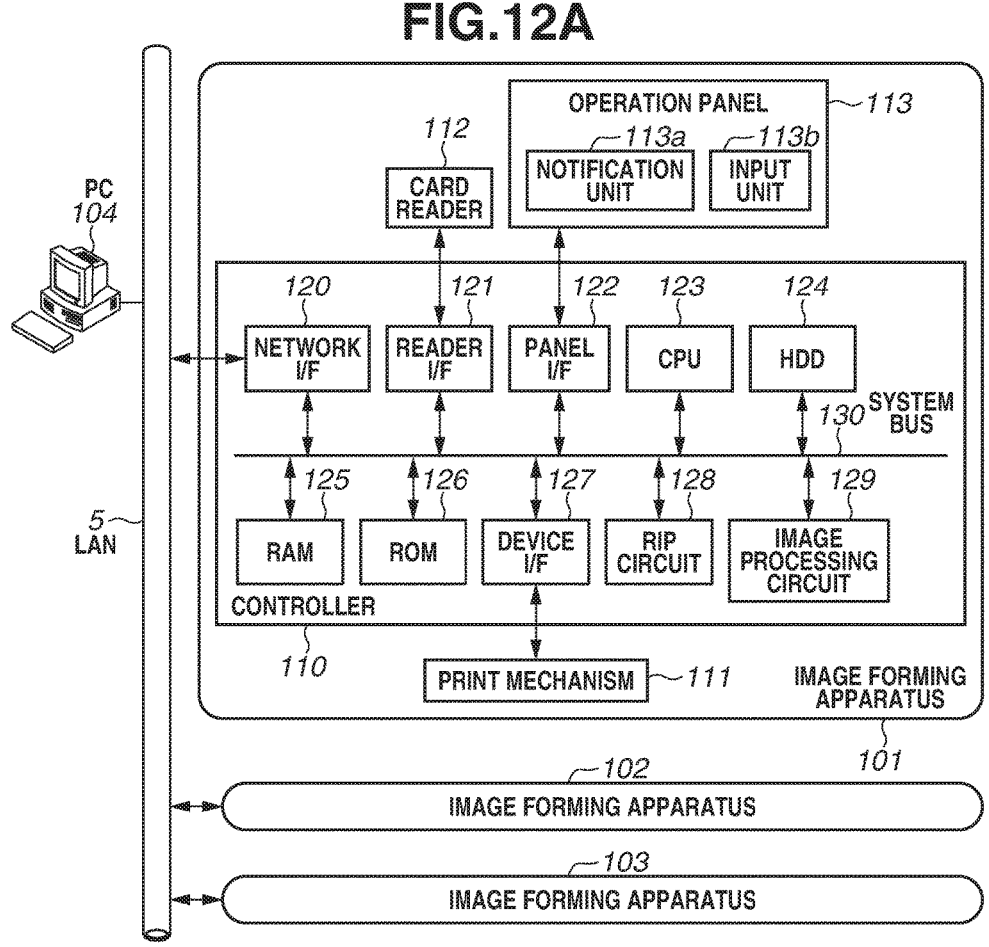
FIG. 12A is a diagram illustrating an image forming system according to a second exemplary embodiment.
Figure 12B:
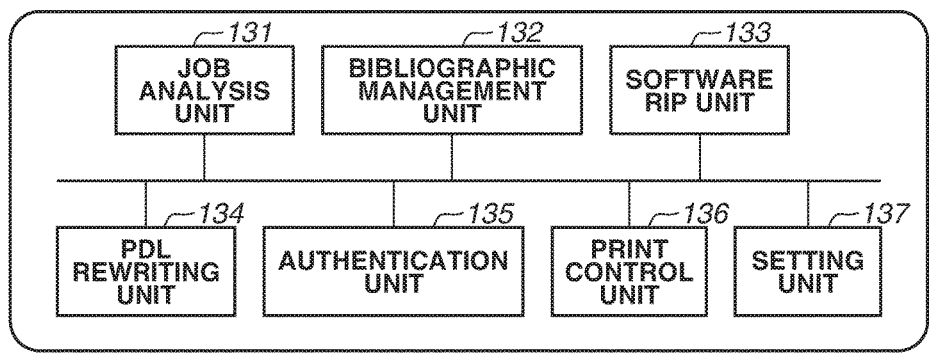
FIG. 12B is a block diagram illustrating a software configuration of an image forming apparatus according to the second exemplary embodiment.

FIG. 12A is a diagram illustrating the configuration of a printing system according to the second exemplary embodiment. FIG. 12B is a diagram illustrating the software configuration of a printing apparatus 101 according to the second exemplary embodiment. A printing system includes a printing apparatus 101, which has a server function, other printing apparatuses 102 and 103, and a PC (host computer) 104. These apparatuses are connected to each other via a LAN 5, such as Ethernet (registered trademark), so that the apparatuses can communicate with each other. In the printing system, print data output from the PC 104 is accumulated in the printing apparatus 101 and becomes able to be transmitted to the other printing apparatuses 102 and 103. Then, the print data is printed by the printing apparatus 101, or transmitted to either of the other printing apparatuses 102 and 103 and printed.

[Software Configuration of Server]

The controller 110 according to the second exemplary embodiment executes various programs to function as various function units. Specifically, the functions are achieved by loading a program stored in the ROM 126 or the HDD 124 into the RAM 125, and by the CPU 123 executing the program. The controller 110 includes as the function units a job analysis unit 131, a bibliographic management unit 132, a software RIP unit 133, a PDL rewriting unit 134, an authentication unit 135, a print control unit 136, and a setting unit 137.

The job analysis unit 131 has a function similar to those of the job analysis units 211 and 221. The bibliographic management unit 132 has a function similar to those of the bibliographic management units 212 and 222. The software RIP unit 133 has a function similar to that of the software RIP unit 213. The PDL rewriting unit 134 has a function similar to that of the PDL rewriting unit 214. The authentication unit 135 has a function similar to those of the authentication units 215 and 223. The print control unit 136 has a function similar to that of the print control unit 224. The setting unit 137 has a function similar to those of the setting units 216 and 225. That is, the controller 110 according to the second exemplary embodiment has both the functions of the controller 150 according to the first exemplary embodiment and the functions of the controller 110 according to the first exemplary embodiment.

A configuration in which an external apparatus connected to the printing apparatus 101 executes part or all of program processing for achieving the function units, i.e., a so-called cloud configuration, may be employed.

[Image Forming Sequence]

A description is given of an entire sequence in a case where printing is performed using the printing system. FIG. 13 is a diagram illustrating the processing sequence of the image forming system according to the second exemplary embodiment.

To start an image forming sequence, first, in step S1301, the user makes a login request to the PC 104. In the login request, the user inputs user information, such as a user account name, and authentication information, such as a password. The PC 104 performs a login process of the user based on the information input by the user. The user specifies a document to be printed and gives an instruction to execute the printer driver. If the printer driver starts, then in step S1302, the user specifies the output destination and the print settings of print data and then gives a print instruction. In step S1303, based on the specified document, the specified print settings, and the user information of the logged-in user, the PC 104 creates print data. If creating the print data, then in step S1304, the PC 104 transmits the print data to the printing apparatus 101. If the print data is sent, then in step S1305, the printing apparatus 101 performs a reception process for receiving the print data. If receiving the print data, then in step S1306, the printing apparatus 101 registers bibliographic information regarding the received print data in a bibliographic information DB. If the bibliographic information is registered, then in step S1307, the printing apparatus 101 performs a preceding RIP process. Then, in step S1308, the user makes a login request to the printing apparatus 101. In step S1309, the printing apparatus 101 performs a login process according to the login request. After the login is successful, then in step S1310, the printing apparatus 101 displays a job list for the logged-in user. Confirming the displayed print data list, then in step S1311, the user selects print data to be printed and gives a print instruction. In step S1312, the printing apparatus 101 performs a finishing RIP process on the preceding-RIP-processed print data. Then, in step S1313, the printing apparatus 101 performs printing based on generated image data.

[Job Reception Process]

Figure 14:
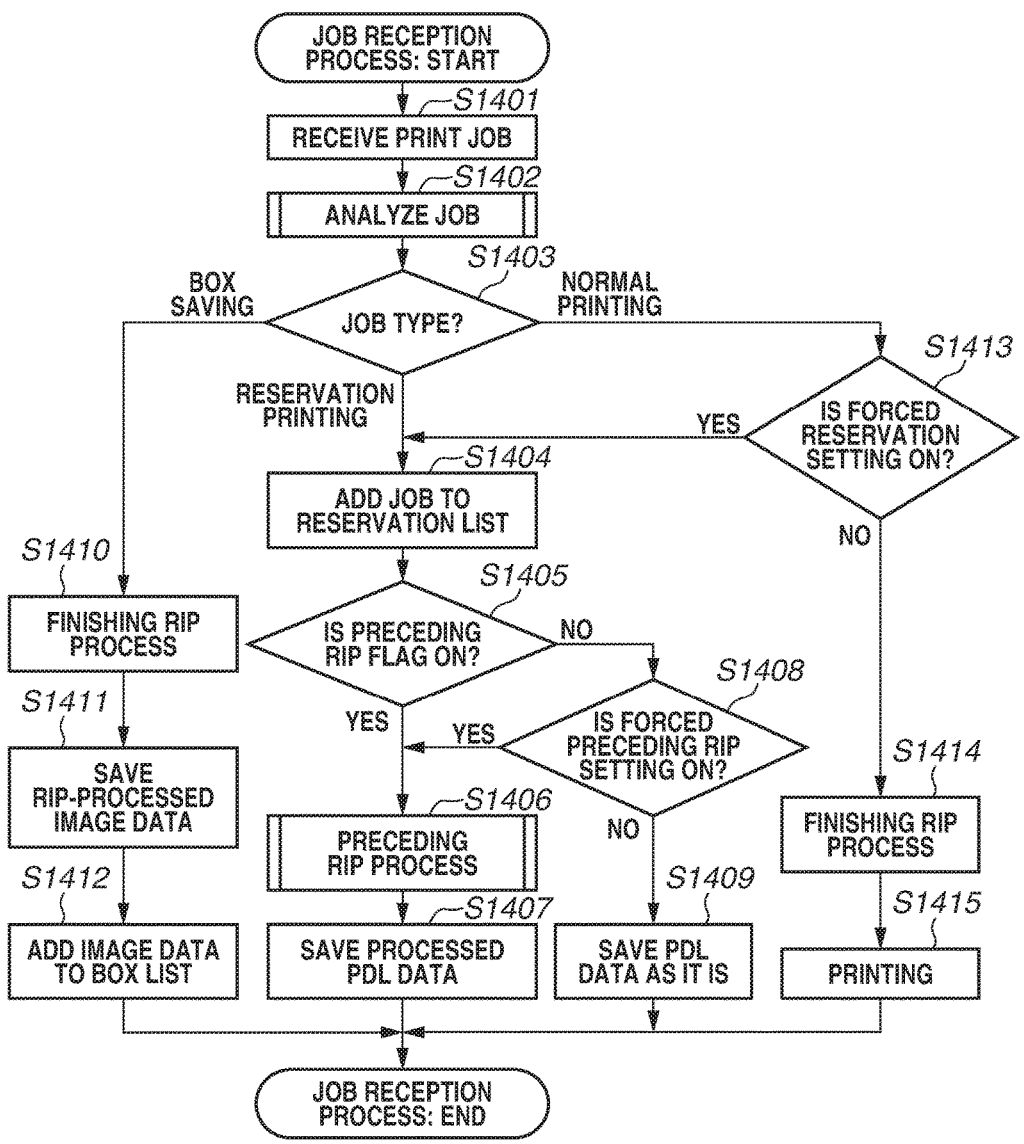
FIG. 14 is a diagram illustrating a flowchart of a job reception process according to the second exemplary embodiment.

According to the reception of the print data in step S1305, the printing apparatus 101 executes a job reception process. FIG. 14 is a diagram illustrating a flowchart of the job reception process described in detail below.

If the print data is transmitted via a network, such as the LAN 5, then in step S1401, the controller 110 receives the print data using the network I/F 120. Next, in step S1402, the controller 110 analyzes the print data in the PDL format using the job analysis unit 131. Then, in step S1403, the controller 110 determines the job type of the print data.

In a case where the received print data is a box saving job (if "save" is specified as the output method) (step S1403: BOX SAVING), then in step S1410, the controller 110 performs a finishing RIP process using the RIP circuit 128 to generate image data. Then, the controller 110 saves the generated image data in the HDD 124. The controller 110 functioning as the bibliographic management unit 132 registers the document name, user information, the address of the saved image data, and a flag indicating box saving in association with each other as a print job in the bibliographic information DB. The print job including the flag indicating box saving is displayed on the box screen 1110 illustrated in FIG. 11A.

In a case where the received print data is a reservation job (if "secure (reserve)" is specified as the output method) (step S1403: RESERVATION PRINTING), the controller 110 functioning as the bibliographic management unit 132 registers job information in the bibliographic information DB. The job information is the document name, user information, the save location of the print data, and a flag indicating reservation. The registered bibliographic information can be transmitted to the other printing apparatuses 102 and 103 at this stage. The print job including the flag indicating reservation printing is displayed on the reservation printing screen 1120 illustrated in FIG. 11B. Thus, the user can give a print instruction at this stage.

Next, in step S1405, the controller 110 determines whether the print data includes a preceding RIP flag. In a case where the print data includes a preceding RIP flag (YES in step S1405), then in step S1406, the controller 110 functioning as the software RIP unit 133 performs a preceding RIP process on the print data. The details of the preceding RIP process will be described below. In step S1407, the controller 110 stores, in the HDD 124, processed PDL data obtained as a result of the preceding RIP process.

In a case where the print data does not include a preceding RIP flag (NO in step S1405), then in step S1408, the controller 110 determines whether the forced preceding RIP function is set. In a case where the forced preceding RIP setting is on (YES in step S1408), then in step S1406, the controller 110 performs a preceding RIP process on the print data. In a case where the forced preceding RIP setting is off (NO in step S1408), then in step S1409, the controller 110 stores the received print data in the HDD 124 without processing the print data.

In a case where the received print data is a normal print job (if "print" is specified as the output method) (step S1403: NORMAL PRINTING), then in step S1413, the controller 110 confirms whether a forced reservation setting is on. In a case where the forced reservation setting is on (YES in step S1413), the controller 110 processes the received print data as a reservation job. In a case where the forced reservation setting is off (NO in step S1413), then in step S1414, the controller 110 performs a finishing RIP process on the print data using the RIP circuit 128. The controller 110 causes the image processing circuit 129 to correct image data generated by the finishing RIP process. Then, in step S1415, the controller 110 functioning as the print control unit 136 transmits the corrected image data to the print mechanism 111 to cause the print mechanism 111 to form an image.

A series of processes in the job reception process is performed as described above.

[Instruction Reception Process]

Figure 15:
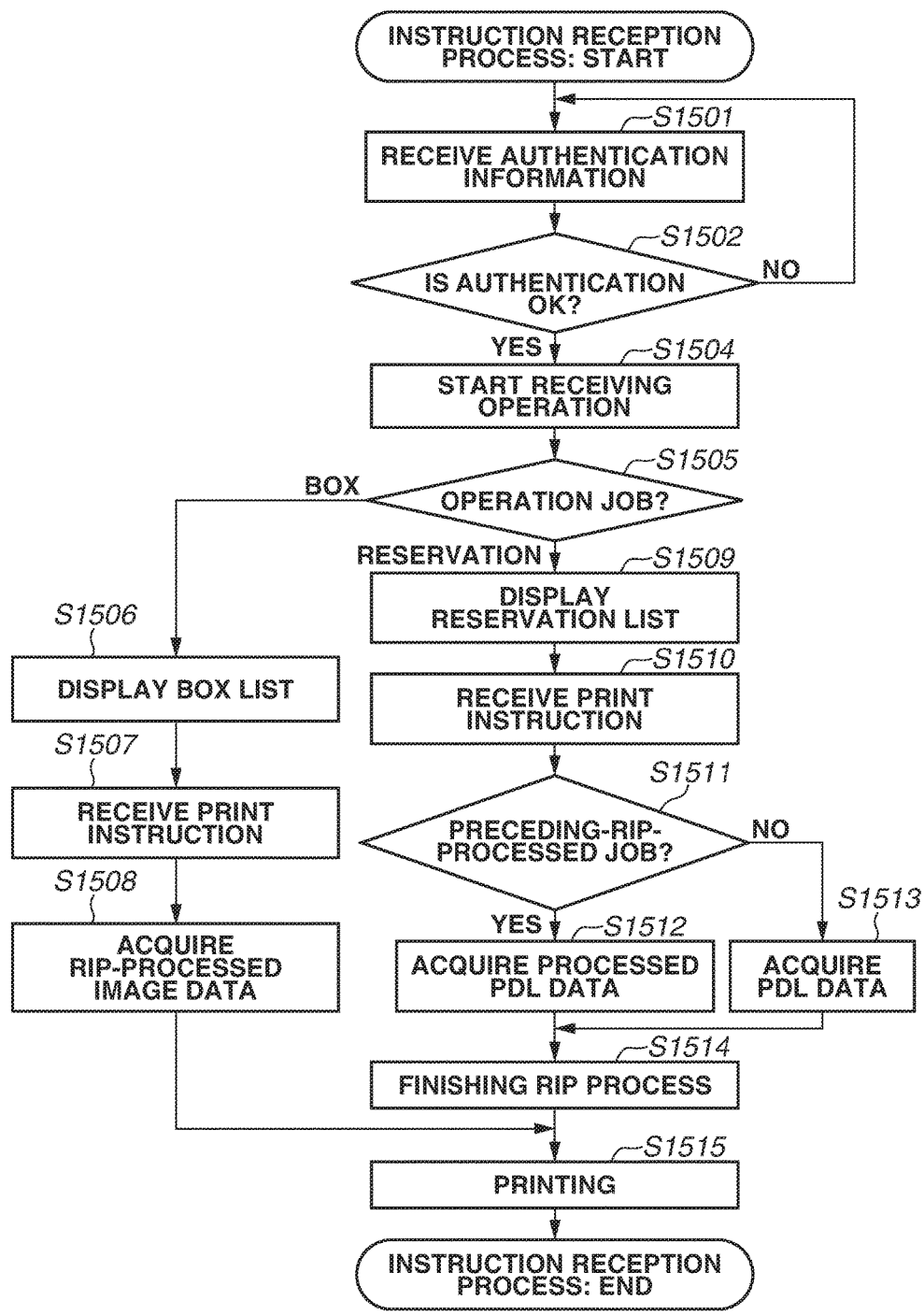
FIG. 15 is a diagram illustrating a flowchart of an instruction reception process according to the second exemplary embodiment.

According to the login of the user in step S1309, the printing apparatus 101 executes an instruction reception process. The instruction reception process is described in detail below. FIG. 15 is a diagram illustrating a flowchart of the instruction reception process.

If the user presses any of the input keys of the operation panel 113, then in step S1501, the controller 110 displays a login screen (not illustrated) on the operation panel 113 and starts receiving authentication information. If authentication information is input from the card reader 112 or an input key while the login screen is displayed, the controller 110 determines authentication. If user authentication is failed (NO in step S1502), the controller 110 continues to receive authentication information. In a case where user authentication is successful (YES in step S1502), then in step S1503, the controller 110 reflects information regarding the authenticated user on applications. Then, in step S1504, the controller 110 permits the user to operate various functions (applications).

In a case where the user specifies an operation of the box function (step S1505: BOX), the controller 110 displays the box screen 1110 on the operation panel 113. On the box screen 1110, the list 1111 of print data for which "save" is specified as the output method is displayed. In step S1507, the user selects print data from among the list 1111 and selects the print instruction button 1112, and thereby can give a print instruction. If the print instruction button 1112 is selected, then in step S1508, the controller 110 reads, from the HDD 124, RIP-processed image data corresponding to the selected print data. In step S1515, the controller 110 outputs the image data to the print mechanism 111. On the box screen 1110, it is possible to give a transmission instruction in addition to a print instruction.

If the user specifies an operation of the reservation printing function (step S1505: RESERVATION), the controller 110 displays the reservation printing screen 1120 on the operation panel 113. In step S1509, on the reservation box screen 1110, the list 1121 of print jobs for which "reserve" is specified as the output method, or print jobs forcibly reserved by the setting of the apparatus is displayed. In the present exemplary embodiment, in the print data reserved in the printing apparatus 101, only print jobs associated with the logged-in user are displayed in the list 1121. In the list 1121, in addition to the document name and the input time of print data, the preceding process state and the estimated processing time of the print data are indicated. The user selects a print job from among the list 1121 and selects the print instruction button 1122, and thereby can give a print instruction. If the user selects the print setting button 1123 before giving a print instruction, the user can change print settings. If the print instruction button 1122 is selected, the controller 110 receives the input of a print instruction and reflects the giving of the print instruction on applications. Then, in a case where the selected print job has already been preceding-RIP-processed (YES in step S1511), then in step S1512, the controller 110 reads processed PDL data from the HDD 124. In a case where the selected print job has not yet been preceding-RIP-processed (NO in step S1511), then in step S1513, the controller 110 reads, from the HDD 124, PDL data that has not yet been processed in the state where the PDL data is received. Reading the PDL data, then in step S1514, the controller 110 transmits the PDL data to the RIP circuit 128 and performs a finishing RIP process on the PDL data. Acquiring image data preceding-RIP-processed in step S1508 or S1514, then in step S1515, the controller 110 causes the image processing circuit 129 to correct an image and then transmits the image data to the print mechanism 111, to cause the print mechanism 111 to print the image data.

A series of processes in the instruction reception process is performed as described above.

[Effects]

According to the present exemplary embodiment, the printing apparatus 101 can achieve a preceding RIP process. That is, the printing apparatus 101 can perform a RIP process on print data before the user gives a print instruction. Thus, it is possible to reduce the waiting time for the user after the print instruction is given.

According to the present exemplary embodiment, it is possible to perform a preceding RIP process on only a page that needs a preceding RIP process, such as a page that requires time for rendering. In other words, a preceding RIP process according to the present exemplary embodiment is different from a box saving job in that not all the pages are rendered. Not all the pages are rendered, whereby it is possible to reduce the number of pieces of image data held after rendering, and reduce the data size. Thus, it is possible to reduce the tightness of the capacity of the HDD 124. Further, even in a case where data is transmitted to the printing apparatuses 102 and 103, it is possible to reduce an increase in network traffic. Then, it is possible to contribute to an increase in the speed of transferring print data.

According to the present exemplary embodiment, using a driver on a PC side, a user can specify whether to perform a preceding RIP process. Thus, it is possible to appropriately perform a preceding RIP process on a job that needs a preceding RIP process.

According to the present exemplary embodiment, it is possible, based on the setting of a printing apparatus, to change whether to perform a preceding RIP process. Thus, it is not necessary to set whether to perform a preceding RIP process, with respect to each job on a printer driver side. This leads to excellent usability.

According to an embodiment, it is possible to provide an image processing apparatus capable of improving the performance of an image forming apparatus while reducing an increase in network traffic.

[Other Exemplary Embodiments]

In the first exemplary embodiment, a preceding RIP method is determined based on a connected apparatus. Alternatively, a fixed preceding RIP method determined in advance may be used. In this case, it is desirable that the fixed RIP method should be a large-size, high-image-quality, and color format.

In the first exemplary embodiment, to identify a page to be preceding-RIP-processed, an estimated time required for a rendering process is used. However, a method for identifying a page to be preceding-RIP-processed is not limited to this.

For example, a page to be preceding-RIP-processed may be identified based on the data size of PDL data on a page-by-page basis. Specifically, the configuration may be such that a preceding RIP process is not performed on a page having a data size less than or equal to a predetermined value (e.g., 50 MB), and a preceding RIP process is performed on a page having a data size larger than the predetermined value (e.g., 50 MB).

Alternatively, a page to be preceding-RIP-processed may be identified based on the number of commands in PDL data on a page-by-page basis. Specifically, the configuration may be such that a preceding RIP process is not performed on a page in which the number of commands is less than or equal to a predetermined value (e.g., 10000 commands), and a preceding RIP process is performed on a page in which the number of commands is greater than the predetermined value (e.g., 10000 commands).

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-241710, filed Dec. 13, 2016, which is hereby incorporated by reference herein in its entirety.

What is claimed is:

1. An image processing apparatus capable of transmitting print data to an image forming apparatus for forming an image on a sheet based on print data, the image processing apparatus comprising:
   one or more controllers configured of at least one processor or at least one circuit having a function, the one or more controllers configured to perform:
   receiving print data including a plurality of pages;
   generating transmit print data to be transmitted to the image forming apparatus, the transmit print data including, for a first page of which print data meets a predetermined condition among the plurality of pages, page image data which is generated by performing rendering processing on the print data of the first page and, for a second page of which print data does not meet the predetermined condition among the plurality of pages, print data of the second page on which rendering processing has not been performed,
   wherein the transmit print data that is transmitted to the image forming apparatus has a command in a PDL format for reading the generated page image data.

2. The image processing apparatus according to claim 1, wherein the received print data is PDL data and the page image data is generated by performing rendering process on a part of the PDL data.

3. The image processing apparatus according to claim 2, wherein according to the reception of the PDL data, the one or more controllers start the identification process on the received PDL data.

4. The image processing apparatus according to claim 2, wherein in a case where a page for which page image data is to be generated is identified, the one or more controllers start generating page image data based on print data of the identified page.

5. The image processing apparatus according to claim 2, wherein the image processing apparatus can receive PDL data in a plurality of language formats including PDL data in a first language format and PDL data in a second language format, and
   wherein, in generating the transmit print data, the one or more controllers generate page image data based on page information of the PDL data in the first language format, and do not generate page image data based on page information of the PDL data in the second language format.

6. The image processing apparatus according to claim 2, wherein the image processing apparatus receives a setting of one of a plurality of modes including a first mode for permitting generation of page image data by the image processing apparatus based on the received PDL data in generating the transmit print data, and a second mode for not permitting generation of page image data by the image processing apparatus based on the received PDL data in generating the transmit print data,
   wherein in a state where the first mode is set, in generating the transmit print data, the one or more controllers execute a series of processes which is for identifying a page for which page image data is to be generated, and generating page image data of the identified page, and
   wherein in a state where the second mode is set, in generating the transmit print data, the one or more controllers do not execute the series of processes.

7. The image processing apparatus according to claim 2, wherein the image processing apparatus can receive PDL data to which setting information regarding whether to permit, in generating the transmit print data, generation of page image data by the image processing apparatus based on page information is assigned,
   wherein in a case where the setting information indicates permission of generation of image data, the one or more controllers execute a series of processes, which is for identifying a page for which page image data is to be generated, and generating image data of the identified page, on received print data in generating the transmit print data, and
   wherein in a case where the setting information indicates no permission of generation of page image data, the one or more controllers do not execute the series of processes on the received print data in generating the transmit print data.

8. The image processing apparatus according to claim 1, wherein the transmit print data that is transmitted to the image forming apparatus is generated by deleting at least one command of the received print data.

9. The image processing apparatus according to claim 1, wherein the predetermined condition is one of:
   a condition that the estimated time required to generate page image data by performing rendering processing on print data of a page is longer than a predetermined time;
   a condition that a data size of print data of a page is larger than a predetermined data size; and
   a condition that the number of particular commands included in print data of a page is greater than a predetermined number.

10. The image processing apparatus according to claim 1, wherein the image processing apparatus is a print server included in the image forming apparatus.

11. An image processing method using an image processing apparatus capable of transmitting print data to an image forming apparatus for forming an image on a sheet based on print data, the method comprising:
   a process of receiving print data including a plurality of pages;
   a process of generating transmit print data to be transmitted to the image forming apparatus, the transmit print data including, for a first page of which print data meets a predetermined condition among the plurality of pages, page image data which is generated by performing rendering processing on the print data of the first page and, for a second page of which print data does not meet the predetermined condition among the plurality of pages, print data of the second page on which rendering processing has not been performed,
   wherein the transmit print data that is transmitted to the image forming apparatus has a command in a PDL format for reading the generated page image data.

12. A non-transitory storage medium having stored therein a program for causing a controller of an image processing apparatus capable of transmitting print data to an image forming apparatus for forming an image on a sheet based on print data to execute a control method, the control method comprising:
   a process of receiving print data including a plurality of pages;
   a process of generating transmit print data to be transmitted to the image forming apparatus, the transmit print data including, for a first page of which print data meets a predetermined condition among the plurality of pages, page image data which is generated by performing rendering processing on the print data of the first page and, for a second page of which print data does not meet the predetermined condition among the plurality of pages, print data of the second page on which rendering processing has not been performed,
   herein the transmit print data that is transmitted to the image forming apparatus has a command in a PDL format for reading the generated page image data.

* * * * *